United States Patent
Takagi et al.

(10) Patent No.: US 6,979,136 B2
(45) Date of Patent: Dec. 27, 2005

(54) FIBER TYPE OPTICAL MODULE

(75) Inventors: Seiji Takagi, Yamato (JP); Noboru Fukushima, Yamato (JP); Chohei Hirano, Yamato (JP); Toshiki Sakamoto, Yamato (JP)

(73) Assignee: Okano Electric Wire Co., Ltd., Kanagawa (JP)

( * ) Notice: Subject to any disclaimer, the term of this patent is extended or adjusted under 35 U.S.C. 154(b) by 180 days.

(21) Appl. No.: 10/444,057

(22) Filed: May 23, 2003

(65) Prior Publication Data

US 2004/0028353 A1 Feb. 12, 2004

(30) Foreign Application Priority Data

May 23, 2002 (JP) ........................................ 2002-149470

(51) Int. Cl.[7] .................................. G02B 6/36; H04J 14/02
(52) U.S. Cl. ............................. 385/93; 385/92; 385/88; 385/49; 385/31; 385/34; 385/33; 398/82; 398/85
(58) Field of Search ............................ 385/49, 14, 31, 385/33, 34, 36, 24, 88, 89, 92, 93, 94; 398/82, 85

(56) References Cited

U.S. PATENT DOCUMENTS

| | | | |
|---|---|---|---|
| 4,802,727 A | 2/1989 | Stanley | ........................ 350/96.2 |
| 5,005,935 A | 4/1991 | Kunikane et al. | ........ 350/96.16 |
| 5,479,547 A | 12/1995 | Kunikane et al. | ............. 385/47 |
| 5,801,892 A * | 9/1998 | Naganuma et al. | .......... 359/892 |
| 6,167,171 A | 12/2000 | Grasis et al. | .................. 385/24 |
| 6,496,623 B2 * | 12/2002 | Asakura et al. | ............... 385/47 |
| 2001/0026660 A1 * | 10/2001 | Asakura et al. | ............... 385/47 |
| 2003/0063889 A1 * | 4/2003 | Lavallee et al. | ............. 385/137 |
| 2004/0033014 A1 * | 2/2004 | Sasaki et al. | .................. 385/24 |
| 2004/0042720 A1 * | 3/2004 | Asano et al. | .................. 385/34 |

FOREIGN PATENT DOCUMENTS

| | | |
|---|---|---|
| DE | 37 37 251 | 5/1989 |
| EP | 1 116 975 | 7/2001 |
| JP | 56-147111 | 11/1981 |
| JP | 62-501732 | 7/1987 |
| JP | 63-155110 | 6/1988 |
| JP | 4-25805 | 1/1992 |

* cited by examiner

Primary Examiner—Brian M. Healy
(74) Attorney, Agent, or Firm—Westerman, Hattori, Daniels & Adrian, LLP

(57) ABSTRACT

The present invention relates a fiber optical module. A first filter 5 transmits a light with a first predetermined wavelength ($\lambda_A$), and reflects lights with a second predetermined wavelength ($\lambda_B$) and a third predetermined wavelength ($\lambda_C$). A second filter 6 transmits the light with wavelength $\lambda_B$ and reflects the light with wavelength $\lambda_C$. A first light-receiving device 2 receives the light with wavelength $\lambda_A$, and a second light-receiving device 3 receives the light with wavelength $\lambda_B$, A light-emitting device 4 emits the light with wavelength $\lambda_C$. A first optical fiber 1a leads the lights with wavelengths $\lambda_A$ and $\lambda_B$ to the first filter 5. A second optical fiber 1b leads the light with wavelength $\lambda_B$ reflected by the first filter 1a. A third optical fiber 1c leads the light with wavelength $\lambda_C$ emitted by the light-emitting device 4 to the second filter 6.

9 Claims, 19 Drawing Sheets

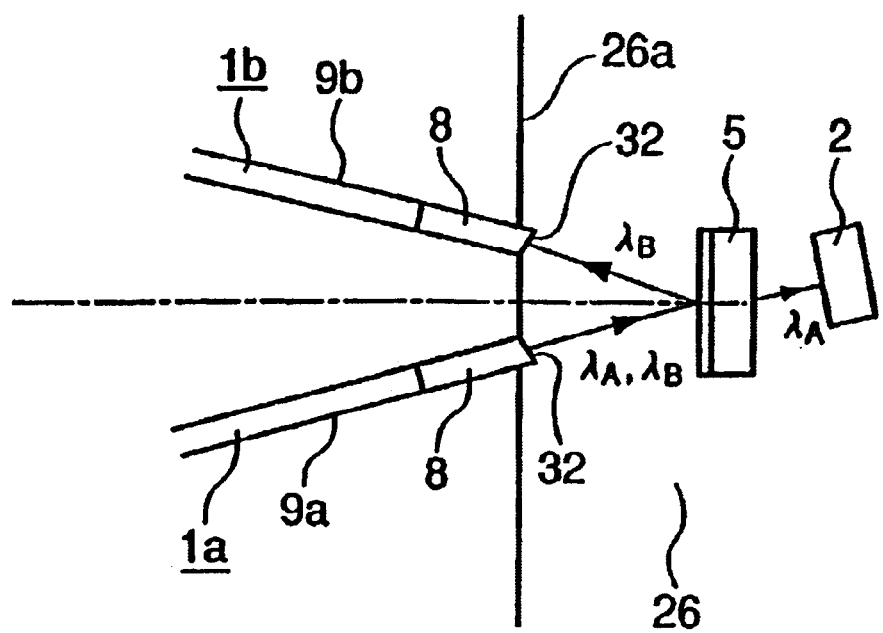

FIBER TYPE OPTICAL MODULE

DETAILED DESCRIPTION OF THE INVENTION

1. Technical Field of the Invention

The present invention is applied to the field of optical communication, and relates to a fiber type optical module such as fiber type three-wavelengths optical module, for separating an optical signal having three or more wavelengths comprising, for example, a video signal for optical communications, Internet signal and the like, and being provided with a light-emitting device such as a laser diode (LD), a light-emitting diode (LED) and a PIN photo diode (PD) along with an optical fiber.

2. Background Art

In recent years, various optical communications are performed by means of optical fiber network. For example, CATV video signals from dozens of channels are transmitted from an broadcasting exchange side to a subscriber side. In addition, by means of modulation means such as 64 QAM, a digital signal is transmitted to the subscriber side from the exchange side at a bandwidth of several hundred MHz to 1 GHz. Additionally, for the purpose of the Internet and data transmission, bi-directional signals are exchanged between the exchange side and the subscriber, at a transmission rate of several 10 Mbps to several hundred Mbps.

The above optical communication is performed by assigning a particular wavelength to each signal. For example, as shown in FIG. 15, a wavelength $\lambda_A$ is assigned to the video signal, while $\lambda_B$ is used as a bi-directional signal; for example, for the data signal from the exchange 10 side to the subscriber 12 side. Further, a wavelength $\lambda_C$ is assigned to the data signal from the subscriber 12 side to the exchange 10 side. In general, a signal transmitted from the exchange 10 side to subscriber 12 is referred to as downstream signal, and a signal transmitted from subscriber 12 to exchange 10 side is referred to as upstream signal. Here, ONU indicates optical network unit.

Furthermore, in such a system as described above, an optical transmission line 11 is usually formed by one optical fiber, so as to reduce a network cost such as that expended for the installation, and to downsize component/equipment and the like, and via the optical transmission line 11, a wave multiplexing transmission is performed, for example, as to the aforementioned lights with three wavelengths ($\lambda_A$, $\lambda_B$, $\lambda_C$). In addition, the three transmitted wavelengths ($\lambda_A$, $\lambda_B$, $\lambda_C$), are subjected to coupling/decoupling in the exchange 10 side and subscriber 12 side respectively.

The coupling/decoupling is performed at the exchange 10 side by a transmitter/receiver and the like of a head-end device, and at the subscriber 12 side, it is performed in an optical subscriber terminal device installed in the subscriber's house.

In the subscriber 12 side, lights with divided wavelength, that is, a video signal $\lambda_A$ and data signal $\lambda_B$ are received by a light-receiving unit having light-receiving device such as photo diodes. In addition, data signal $\lambda_C$ is emitted from a light-emitting unit having light-emitting device such as laser diodes.

Conventionally, optical coupling/decoupling module as shown in FIG. 16 is installed in the subscriber 12 side to separate three wavelengths. The optical coupling/decoupling module comprises a coupling/decoupling means 22. The coupling/decoupling means 22 is comprised of a thin film type coupler and the like, for example, including the first filter 5 and the second filter 6.

The coupling/decoupling means 22 is connected to the first, the second light-receiving devices 2, 3 and light-emitting device 4, via the optical fibers 21a, 21b and 21c. The light-receiving devices 2, 3 are photo diodes, and the light-emitting device 4 is a laser diode. In addition, the coupling/decoupling means 22 is connected to the light transmission line 11 via the optical fiber 21e.

The aforementioned first filter 5 transmits the video signal with wavelength $\lambda_A$ and reflects the data signal with wavelength $\lambda_B$ to the second filter 6 side, as for the video signal with wavelength $\lambda_A$ and the data signal with wavelength $\lambda_B$, which have been sent from the exchange 10 side, and inputted from the optical transmission line 11.

The video signal with wavelength $\lambda_A$ passes through the first filter 5, and is received by the first light-receiving device 2 through the optical fiber 21a. And, a weak signal from this light-receiving device 2 is amplified via the pre-amplifier (TIA; Trans Impedance Amplifier) 40 comprising hybrid ICs, and it is optically connected to the data processing circuit (drive circuit) 41 such as video circuit.

The second filter 6 reflects the data signal with wavelength $\lambda_B$ and it transmits the data signal with wavelength $\lambda_C$ emitted from the light-emitting device 4. Here, the data signal with wavelength $\lambda_B$ reflected by the first filter 5 is further reflected by the second filter 6, and is received by the light-receiving device 3 through the optical fiber 21b. And, a weak signal from this light-receiving device 3 is amplified via the pre-amplifier (TIA; Trans Impedance Amplifier) 43 comprising hybrid ICs, and it is also connected to the data processing circuit 44.

The data signal with wavelength $\lambda_C$ emitted from the light-emitting device 4 passes through the second filter 6, reflected by the first filter 5 and is incident on the light transmission line 11 side. This data signal is transmitted to the exchange 10 side through the light transmission line 11.

In FIG. 17, a conventional optical coupling/decoupling module is shown. This optical coupling/decoupling module includes coupling/decoupling means 22, and is formed by connecting the coupling/decoupling means 22, light reception means 13, 14, and light transmission means 15. The coupling/decoupling means 22 is formed by connecting the first coupling/decoupling means 23 and the second coupling/decoupling means 24.

The first coupling/decoupling means 23 comprises the first filter 5. The first filter is a filter having a suitable thickness and is provided on a substrate of quartz or heat-resisting glass having around 0.5–1 mm thickness, and has a predetermined spectral performance. In other words, the first filter 5 has a property to transmit the light with wavelength $\lambda_A$ and reflect the lights with wavelength $\lambda_C$ and wavelength $\lambda_C$.

In addition, the first coupling/decoupling means 23 comprises the first fiber holding means 33, the first lens 34, the second lens 37, the second fiber holding means (holding means) 38, the third lens 35, and the third fiber holding means 36. The first, the second, and the third lenses 34, 37, and 35 are glass lenses having an outer diameter around 3–5 mm.

In addition, the fiber holding means is to fix the optical fiber to a metal housing which is not illustrated, the optical fiber being extremely thin with a diameter of 125 micron and being easy to break, as shown in FIG. 18A. The fiber holding means comprises a tubular housing 45, and is formed by putting the optical fiber into a through-hole 46 of the tubular housing 45, fixed with an adhesive 47 such as epoxy resin.

The tubular housing 45 is formed by metals, quartz and a glass capillary and the like, having outer diameter around 1–3 mm, for example, and the inner diameter of the through-hole 46 is 127–130 μm. In addition, as shown in FIG. 18B, one end face 42 of the fiber holding means is subjected to angled polishing, so that a light in the optical fiber 21 is not reflected at the surface.

As shown in FIG. 17, lights with wavelength $\lambda_A$, and wavelength $\lambda_B$ (a signal light) which have been sent out from the exchange 10 side and propagated through the light transmission line 11 are incident on the first fiber holding means 33, via the optical fiber 21e. This light is incident on the first lens 34, shaped to a parallel light by means of the first lens 34, and inputted to the first filter 5. The first lens 34 is provided at a position several millimeters from the first filter 5.

The second lens 37, condensing a parallel signal light ($\lambda_A$) passing through the first filter 5, and it is incident on the optical fiber 21a held by the second fiber holding means 38. The signal light ($\lambda_A$) inputted into the optical fiber 21a is incident on the optical receiving means 13 having the first light-receiving device 2.

On the other hand, the third lens 35, condensing a parallel signal light ($\lambda_B$) reflected by means of the first filter 5, leads the light to the second coupling/decoupling means 24 side via the optical fiber 21d held by the third fiber holding means 36.

The second coupling/decoupling means 24 comprises of the second filter 6. The second filter 6 is a filter having a given thickness provided on a substrate of quartz or heat-resisting glass having around 0.5–1 mm thickness, and it transmits the light of wavelength $\lambda_C$, and reflect the light with wavelength $\lambda_B$. The second coupling/decoupling means 24 separates downstream signal $\lambda_B$ and upstream signal $\lambda_C$, by the second filter 6.

In addition, the second coupling/decoupling means 24 comprises the fourth lens 51, the fourth fiber holding means 52, the fifth fiber holding means 54, the fifth lens 53, the sixth lens 55, and the sixth fiber holding means 56. The fourth, the fifth, and the sixth lens 51, 53 and 55 are glass lenses having an outer diameter of around 3–5 mm.

The fourth fiber holding means 52 inputs a signal light ($\lambda_B$) into the fourth lens 51, the light being introduced from the first coupling/decoupling means 23 side via the optical fiber 21d. The fourth lens 51 is used to shape this signal light to a parallel light, and inputs the parallel light to the second filter 6. The second filter 6 reflects the signal light ($\lambda_B$) to the fifth lens 53 side.

The fifth lens 53, condensing a signal light ($\lambda_B$) reflected by the second filter 6, inputs the signal light to the optical fiber 21b held to the fifth fiber holding means 54. The signal light ($\lambda_B$) inputted into the optical fiber 21b is further inputted into the light-receiving means 14 having the second light-receiving device 3.

The sixth fiber holding means 56 inputs into the sixth lens 55 a signal light ($\lambda_C$) emitted from the light transmission means 15 having the light-emitting device 4. The sixth lens 55 makes the shape of this signal light into a parallel light, and it is inputted to the second filter 6. The second filter 6 transmits this signal light ($\lambda_C$).

The fourth lens 51 and the fourth fiber holding means 52 lead the signal light ($\lambda_C$), which has passed through the second filter 6, to the first coupling/decoupling means 23 side via the optical fiber 21d.

The third fiber holding means 36 of the first coupling/decoupling means 23 inputs to the third lens 35, a signal light ($\lambda_C$) that is inputted into the first coupling/decoupling means 23 from the second coupling/decoupling means 24 side. The third lens 35 is for making the shape of this signal light as a parallel light, and it is inputted to the first filter 5. The first filter 5 reflects the signal light ($\lambda_C$) and leads it to the first lens 34 and the first fiber holding means 33. The signal light ($\lambda_C$) which passed through the first lens 34 and the first fiber holding means 33 is inputted into the light transmission line 11.

The aforementioned plurality of lenses, a plurality of fiber holding means and a plurality of filters and the like, forming the first and the second coupling/decoupling means 22 and 23, are fixed by a fixing means such as YAG welding to a metallic platform of SUS303 and the like, after fiber axis adjustment as described later, and sealed by a metal housing of SUS303 and the like.

In addition, the light reception means 13 comprises a fiber holding means 57 and a lens 58. Similarly, the light reception means 14, and the light transmission means 15 comprise a fiber holding means and a lens. In FIG. 17, the light reception means 14 and the light transmission means 15 are shown by omitting the fiber holding means, lens, pre-amplifier and the like.

The light reception means 13, 14, and the light transmission means 15 are fixed with solder and the like after a photo diode, a laser diode, a pre-amplifier and the like were adjusted to a given configuration, and they are accommodated in the metal housing of SUS303 like the one above, and sealed to air tight.

The fiber holding means provided in the first and the second coupling/decoupling means 23, 24, the light reception means 13, 14 and the light transmission means 15, respectively, and lenses corresponding to those fiber holding means are disposed integrally. As shown in FIG. 18C, in a housing comprising a front housing 48 and a rear housing 49, the fiber holding means comprising a tubular housing 45 as shown in FIGS. 18A, B, and lenses corresponding thereto are disposed integrally, and then the lens fiber holding means is formed.

The optical fiber 21 in FIG. 18C is a corresponding optical fiber out of the optical fibers 21a to 21e shown in FIG. 17, and coating (fiber coating) of the end side of this optical fiber 21 is removed, and it is inserted into the tubular housing 45 as described above. A length of the fiber coating removal area at the end of the optical fiber 21 is around several mm—10 mm. And the end face (a end face) of the optical fiber 21 is subjected to the angled polish of 6–8° with respect to a plane (a plane along R in FIG. 18) perpendicular to the optical axis of the optical fiber 21, together with one end face 42 of the tubular housing 45.

As thus described, with the angled polish on the connection end face of the optical fiber 21, it is possible to prevent a light incident to the end face of the optical fiber 21 from the exchange side, from returning against the incident direction, whereby suppressing a deterioration of the laser diode and the like and deterioration of the shape of the signal on the photo diode which is provided at the incident side.

The tubular housing 45 of the fiber holding means is provided in the rear housing 49, and the lens is accommodated in the front housing 48. The fiber holding means and the lens are disposed with a space there between. The front housing 48 is made of materials such as SUS303, and is precisely machined. In order to suppress a light reflection on the lens surface, the lens is provided with an antireflection film of silicon oxide or tantalum pentoxide lamination films, and then mounted on the front housing 48.

Next, the fiber holding means, and optical axis adjustment and a fixing method of the lens will be explained. At first, a central axis of the front housing 48 is adjusted by use of a precision 5-axis-adjusting machine (not illustrated), so that it coincides with the central axis of the fiber holding means, and the lens is mounted on the front housing 48. Subsequently, by means of a similar precision 5-axis optical axis adjusting machine, the tubular housing 45 and the rear housing 49 are fixed with fixing means 62 such as YAG welding and the like, and then, the front housing 48 and the rear housing 49 are fixed by the fixing means 63 such as YAG welding and the like.

In addition, C in FIG. 18 indicates the central axis of the fiber holding means. The front housing 48 and the rear housing 49 are positioned, so that the central axes thereof coincide with each other in tolerance of within 0.3 μm in the orientations of X, Y and Z (an optical axis orientation, and orientations perpendicular to the optical axis, being perpendicular to each other), and further the gate angles of the central axes coincide with each other in tolerance of within 0.3 μm, and then they are fixed and assembled by the fixing means such as YAG welding.

As described above, the fiber holding means and the lens, which are disposed integrally within the front housing 48 and the rear housing 49, are arranged in a housing 60 as shown in FIG. 19. According to this arrangement, the first and the second coupling/decoupling means 23, 24 are formed. Here, FIG. 19 shows a configuration of the first coupling/decoupling means 23. It should be noted that an arrangement configuration of the fiber holding means in the second coupling/decoupling means 24 is similar to that of the first coupling/decoupling means 23.

The housing 60 is made of SUS303 and the like, and is made by precise machining at a tolerance within 0.3 μm. When the coupling/decoupling means 23 is fabricated, the filter 5 and the first to the third fiber holding means 33, 36, 38 and the first to the third lens 34, 35, 37 are disposed in the housing 60, allowing three wavelengths ($\lambda_A$, $\lambda_B$, $\lambda_C$) to pass through.

And, optical power meters are provided on the fiber end of each fiber holding means 33, 36, and 38 (three fiber ends), while measuring light power level of each wavelength for final positional precision adjustment by use of the 5-axis optical axis adjustment machine. Then, the first coupling/decoupling means 23 is assembled by fixing by the fixing means such as YAG welding.

The second coupling/decoupling means 24 is assembled in a similar manner.

As for the light reception means 13, the light reception means 14, and the light transmission means 15 as shown in FIG. 17, a fiber holding means that is integrated with a lens has been produced in a same manner as described above, with a transmission/reception means housing that accommodating optical devices such as LD, PD, and so on, an optical axis adjustment is performed by the optical power measurement with optical power meter, and then, the fiber holding means and the transmission/reception means housing are fixed and assembled by a fixing method such as YAG welding.

Furthermore, in the light reception means 13, 14, and the light transmission means 15, for example, as shown in a perspective view of FIG. 20(*a*) and a sectional view of FIG. 20(*b*), the light-receiving/emitting device (here, light-receiving device 2) and the TIA circuit unit of the preamplifier provided on the circuit board such as alumina, are integrated by soldering the lead wire 85 projecting from a back plane of the light-receiving/emitting device with a through-hole 64 provided in the circuit board 63.

PROBLEMS TO BE SOLVED BY THE INVENTION

However, the conventional optical coupling/decoupling module has had such problems as shown in the following. Firstly, there have been problems that materials cost of lens fiber holding means constituting the optical coupling/decoupling module is high, and investments on the precise processing machine such as 5-axis optical adjustment machine and YAG welding machine are large. For example, as for the lens fiber holding means, the required number thereof is large, and mechanical precision required for each component is extremely high, thus costs of the fiber holding means, tubular housing 45, and a housing are high.

Secondly, there has been a problem that it takes long time to make precise adjustment of less than 0.3 μm to assemble conventional optical coupling/decoupling modules. In other words, as for each element of the coupling/decoupling means 23, 24 and the like constituting the optical coupling/decoupling module, 5-axis optical adjustment is necessary not only in forming the lens fiber holding means, but also it is necessary in assembling each element. Therefore, there has been a problem that it takes more than 30 minutes for each set, as assembly processing time, causing extremely low productivity.

Thirdly, there has been a problem that the optical coupling/decoupling module is configured with a plurality of outer housings and a plurality of fibers, and thus handling is difficult. In other words, an optical component is required to have an extremely high reliability for stabilization of communication system, and an expensive airtight scaling is necessary. However, since the above optical coupling/decoupling module is formed by combining separated different coupling/decoupling means 23, 24, light reception means 13, 14, and light transmission means 15, and further splicing of each had been necessary, that made duplication in housings and fibers causing a relatively bad handling, together with the problem of that the module became expensive.

Fourthly, there has been a problem that the optical coupling/decoupling module is large in size. In other words, since the coupling/decoupling means is formed by separated components for the light reception means 13, 14, the light transmission means 15, and the first and the second coupling/decoupling means 23, 24, and further uses a plurality of lenses and fiber holding means, it has been difficult to downsize the optical coupling/decoupling module. For example, substantially, it was difficult to make the optical transmission/reception means equal to or less than 20 mm$^3$, and as for the coupling/decoupling means, it was difficult to make it equal to or under 40 mm3. Therefore, they were not satisfactory in use.

In addition, in the exchange 10 side, where a lot of optical coupling/decoupling modules are installed, the size of the optical coupling/decoupling module should be small as much as possible to decide the size of the head-end device itself. In addition, also in the subscriber 12 side, it is necessary to be small since installation place is limited in appearance wise. Therefore, it is very unfavorable that module size is large as described above.

The present invention has been achieved to solve the above problems and its objectives are to precisely carry out a coupling/decoupling feature for various wavelengths, for example as the optical branching module, and to provide a small-sized fiber type optical module having a small number of components, short in processing time and further having a high economical efficiency.

MEANS TO SOLVE THE PROBLEM

In order to achieve the above objective, the present invention has the following configuration as a means for solving the problems.

That is, in the first invention, at least one optical device is provided at least either a light-receiving device or a light-emitting device, a lensed fiber formed by integrating a lens system at least on one end side and the above optical device are arranged on a common substrate and accommodated in a housing. The lensed fiber has a configuration where it is fixed in an optical fiber fixing groove formed on the substrate and optically spliced by a corresponding optical device. The configuration above is a means for solving the problems.

In addition to the above first invention, further in the second invention, a first filter that transmits a light with the first predetermined wavelength, and reflects lights with a second predetermined wavelength and a third predetermined wavelength, which are different from the first predetermined wavelength, and a second filter that transmits the light with the second predetermined wavelength and reflects the light with the third predetermined wavelength, which is different from the second predetermined wavelength, are provided on a substrate.

On the substrate, a light-emitting device that emits the light with the third predetermined wavelength is provided in an incident side of the second filter, and a first optical fiber for leading the lights with the first predetermined wavelength and the second predetermined wavelength to the first filter, a second optical fiber for leading the light with the second predetermined wavelength reflected by the first filter to the second filter, and the third optical fiber for leading the light with the third predetermined wavelength emitted by the light-emitting device to the second filter are respectively formed in the lensed fiber.

Here, the first optical fiber is fixed into a first optical fiber fixing groove formed in a direction intersecting the first filter, the second optical fiber is fixedly inserted in the second optical fiber fixing groove formed in a direction intersecting the first filter and the second filter, and the third optical fiber is fixedly inserted in the third optical fiber fixing groove formed in a direction intersecting the second filter. On the substrate, the first light-receiving device for receiving the light of the first predetermined wavelength in the optical transmission side of the first filter is provided, and in the optical transmission side of the second filter, the second light-receiving device for receiving the light with the second predetermined wavelength is provided. The configuration above is a means for solving the problems.

In addition to the above first and second inventions, the third invention is a configuration where the lens system of the lensed fiber is a graded index fiber. The configuration above is a means for solving the problems.

In addition to the above third invention, the fourth invention is a configuration where the graded index fiber is formed in a length over ¼ of an optical path period of a light periodically transmitted through the graded index fiber, as well as in a length within ⅓ of the optical path period. The configuration above is a means for solving the problems.

In addition to any one of the inventions from the first to the fourth, the fifth invention is a configuration where a traversing groove is formed on the substrate in a direction of traversing the optical fiber fixing groove, the lens system of the lensed fiber and the splicing part of the optical fiber are arranged in the portion where the traversing groove is formed. The configuration above is a means for solving the problems.

In addition to any one of the inventions from the first to the fifth, the sixth invention is a configuration where, around the lensed fiber, a metal film is formed in a partial area in the circumferential direction of the optical fiber, and a line joining one end side of the metal film formed area in the optical fiber circumferential direction and the center of the optical fiber, and a line joining the other end side of the metal film formed area in the optical fiber circumferential direction and the center of the optical fiber, make an angle from 120 to 180°. The configuration above is a means for solving the problems.

In addition to any one of the inventions from the first to the sixth, the seventh invention is a configuration where in the lensed fiber, a positioning portion for deciding an fixing position in the optical fiber fixing groove is formed. The configuration above is a means for solving the problems.

In addition to any one of the inventions from the first to the seventh, the eighth invention is a configuration where a plurality of lensed fibers are provided, at least one pair of the lensed fibers next to each other are arranged in a direction intersecting each other at an end close to the optical device side, and those lensed fibers are arranged to be set in such a manner that angles at the ends close to the side of the optical device become almost equal to each other, with respect to a perpendicular line joining the end faces on one end close to the side of the optical device of the lensed fibers. The configuration above is a means for solving the problems.

In addition to any one of the inventions from the first to the eighth, the ninth invention is a configuration where a plurality of lensed fibers are provided, at least one pair of the lensed fibers next to each other are arranged in a direction intersecting each other at an end close to the optical device side, and the angles formed by these lensed fibers are from around 10 to 20°. The configuration above is a means for solving the problems.

In addition to any one of the inventions from the first to the ninth, the tenth invention is a configuration where the optical fiber fixing groove is V-groove, which indicates the cross-section is V-shaped. The configuration above is a means for solving the problems.

BRIEF DESCRIPTION OF DRAWINGS

FIG. 13 is an explanatory illustration showing another arrangement example of the optical fiber disposed on the substrate.

MODE FOR CARRYING OUT THE INVENTION

Figure 1A:
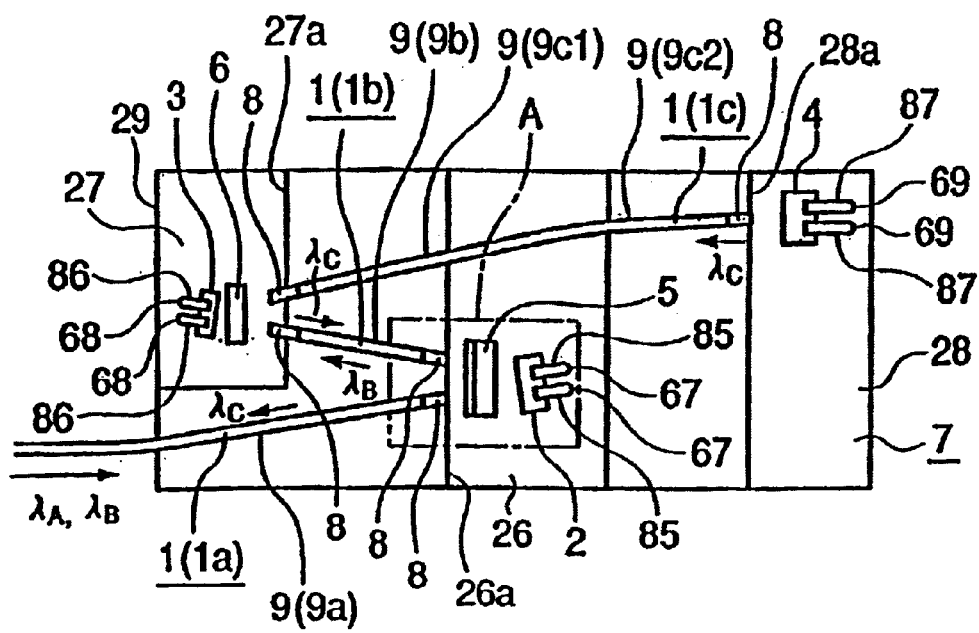
FIG. 1 is a block diagram of a substantial part showing one embodiment of a fiber type optical module relating to the present invention.

Hereinafter, modes for carrying out the present invention will be explained referring to the drawings. In addition, in the explanations of the present embodiments, same signs are assigned to the parts having same names as conventional embodiments, and the duplicated explanations will be omitted or simplified.

Figure 1B:
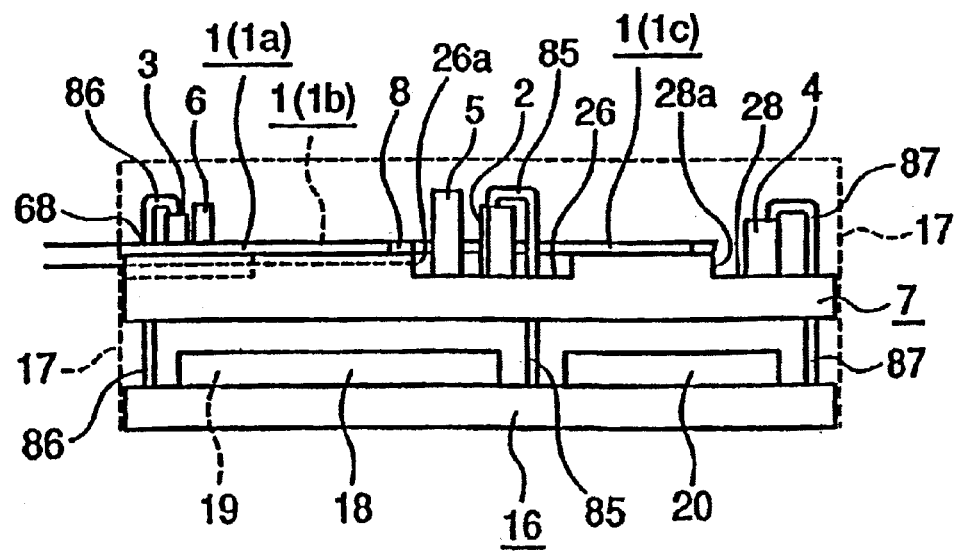

In FIG. 1(a), a configuration of a substantial part of one embodiment of the fiber type optical module relating to the present invention is shown as a plan view in FIG. 1(a), and as a side view in FIG. 1(b).

The fiber type optical module of the present embodiment is formed by accommodating a substrate 7 and a circuit board 16 within a housing 17, and on the substrate 7, at least one optical device, either light-receiving device or light-emitting device (here, two light-receiving devices, such as the first one 2 and the second one 3, and the light-emitting device 4) are provided. The housing 17 has a function to integrally protect the elements accommodated in the housing 17. It should be noted that the housing 17 is omitted in FIG. 1(a).

In addition, the fiber type optical module of the present embodiment comprises the first, the second, and the third optical fibers 1 (1a, 1b, 1c), and these first, second, third optical fibers 1 (1a, 1b, 1c) and the optical devices are provided on the same substrate 7. These first, second, third optical fibers 1 (1a, 1b, 1c) are lensed fibers formed by integrating lens system 8 on at least one end side.

The substrate 7 is formed by silicon, a crystallized glass substrate or a sintered substrate of fine ceramic powders such as glass quartz, and the like, having a thickness around 1 to 3 mm. As shown in FIG. 2, a plurality of optical fiber fixing grooves 9 (9a, 9b, 9c1, 9c2) are provided on the substrate 7 by etching or cutting with milling cutter. The optical fiber fixing grooves 9 (9a, 9b, 9c1, 9c2), are V-grooves having a cross section of V-shaped, and the depth is 100–180 μm.

In addition, on the substrate 7, concave portions (notch portions) 26, 27, and 28 of around 0.5–2 mm depth and through-holes 67, 68, and 69 are provided. End portions 26a, 27a, and 28a of the concave portions 26, 27, and 28 respectively are formed in parallel with the side surface 29 of the substrate 7.

As shown in FIG. 1, a first filter 5 is provided on the substrate 7, the first filter for transmitting a light with the first predetermined wavelength (here $\lambda_A$), and for reflecting a light with the second predetermined wavelength (here $\lambda_B$) and a light with the third predetermined wavelength (here $\lambda_C$), which are different from the first predetermined wavelength. As to the first filter 5, a disposed angle thereof is rotatably adjusted, and it is fixed by soldering on the concave portion 26 of the substrate 7.

In the present specification, expressions such as "fixed in the concave portion" "fixed on the concave portion", and "formed on the concave portion" indicate "fixed or formed on the bottom of the concave portion".

In the concave portion 26, on the side of light transmission side of the first filter 5, the first light-receiving device 2 for receiving the light with the first predetermined wavelength is mounted. A lead terminal 85 of the first light-receiving device 2, passes through a through-hole 67 of the substrate 7 and led to the circuit board 26 that is positioned in the lower side of the substrate 7, as shown in FIG. 1(b). The lead terminal 85 is connected to a PD circuit 18. Here, the PD circuit 18 is a circuit for pre-amplifier (TIA).

Figure 3A:
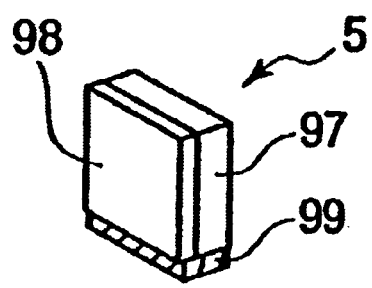
FIGS. 3A and 3B are a perspective view and an explanatory front view showing the first filter applied to the present embodiment above.
Figure 3B:
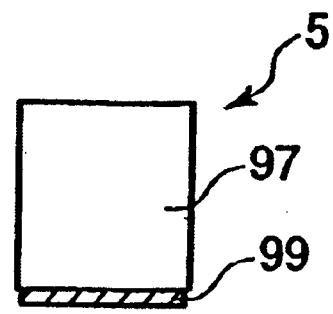

As shown in FIGS. 3(a) and (b), the first filter 5 is made to have a film thickness of 10–30 μm, formed on an optical glass 97 such as BK-7, with films 98 such as titan oxide, tantalum pentoxide, silicon oxide, in a predetermined film thickness, in a predetermined numbers, and in a predetermined sequence. With the features of those films, the first filter 5 is provided with the above functions.

In addition, metal film 99 such as Cr or Ni is provided in a lower surface of the first filter 5, and the first filter 5 is fixed by soldering on the concave portion 26 of the substrate 7 via this metal film 99, as described above.

As shown in FIG. 1(a), a second filter 6 is provided on the substrate 7, the second filter for transmitting a light with the second predetermined wavelength (here $\lambda_B$), and for reflecting a light with the third predetermined wavelength (here $\lambda_C$), which is different from the second predetermined wavelength. It should be noted that optical transmission property and optical reflection property of this second filter 6 are different from those of the second filter 6 conventionally provided. The second filter 6 is fixed by soldering on the concave portion 27 of the substrate 7.

In the concave portion 27, the second light-receiving device 3 for receiving the light with the second predetermined wavelength is provided in the light transmission side of the second filter 6. A lead terminal 86 of the second light-receiving device 3, passes through a through-hole 68 of the substrate 7 and connected to the PD circuit 19 at the circuit board 26, as shown in FIG. 1(b). Here, the PD circuit 19 is a circuit for pre-amplifier.

Similar to the first filter 5, the second filter 6 is formed on an optical glass with films of appropriate materials, with a predetermined thickness, a predetermined numbers, and a predetermined sequence. With the features of the films, the second filter 6 has the above functions. The second filter 6 is also fixed by soldering on the concave portion 27 of the substrate 7, via the metal film formed in the lower surface.

The first optical fiber 1a is the optical fiber that leads light with the first predetermined wavelength and the second predetermined wavelength to the first filter 5, and it is optically coupled with the first filter 5. The first optical fiber 1a is formed by the integration of lens system on the end of the first filter 5 side. The first optical fiber 1a is fixedly inserted in the first optical fiber fixing groove 9 (9a) formed in the direction intersecting the first filter 5, and the end of the first optical fiber 1a is provided 0.5 to 1 mm away from the filter surface of the first filter 5.

The second optical fiber 1b is the optical fiber that leads a light of the second predetermined wavelength reflected by the first filter 5, to the second filter 6, and it is optically coupled with the first filter 5 and the second filter 6. The second optical fiber 1b is formed by the integration of the lens system with the end of the first filter 5 side and the end of the second filter 6 side, respectively.

The second optical fiber 1b is fixed in the second optical fiber fixing groove 9 (9b) formed in the direction intersecting the first filter 5 and the second filter 6. One end of the second optical fiber 1b is provided 0.5 to 1 mm away from the filter surface of the first filter 5, and the other end of the second optical fiber 1b is provided 0.5 to 1 mm away from the filter surface of the second filter 6.

The light-emitting device 4 is a light-emitting device for emitting a light with the third predetermined wavelength, and it is provided in the incident side of the second filter 6. The light-emitting device 4 is formed by a laser diode for modulating and transmitting an upstream data signal of $\lambda_C$ that is the third predetermined wavelength, and fixed on the concave portion 28.

A lead terminal 87 of the light-emitting device 4, passes through a through-hole 69 of the substrate 7 and is connected to the LD circuit 20 of the circuit board 26 as shown in FIG. 1(b). It should be noted that the LD circuit 20 is a circuit for modulation/drive of the laser diode.

The third optical fiber 1c is an optical fiber for leading the light of the third wavelength emitted by the light-emitting device 4, to the second filter 6, and the third optical fiber 1c is fixed in the third optical fiber fixing grooves 9 (9c1, 9c2) provided in the direction intersecting the second filter 6. One end side of the third optical fiber 1c is fixed in the optical fiber fixing groove 9c1, and the other end is fixed in the optical fiber fixing groove 9c2. A central part of the third optical fiber 1c is fixed in the concave portion 26.

The third optical fiber 1c is provided to integrate the lens systems with the end of the light-emitting device 4 side and the end of the second filter 6 side, respectively. The end of the third optical fiber 1c, opposed to the second filter 6, is provided around 0.5–1 mm away from the filter surface of the second filter 6.

The first light-receiving device 2 is a PIN photo diode comprising semiconductor silicon and the like, and is provided at the light transmission side of the first filter 5, and receives a light of the first predetermined wavelength. The first light-receiving device 2 is provided on the substrate 7, around 0.2–1 mm away from the first filter 5.

The second light-receiving device 3 is a PIN photo diode, being provided at the light transmission side of the second filter 6, and receives a light of the second predetermined wavelength. The second light-receiving device 3 is provided on the substrate 7, around 0.2–1 mm away from the second filter 6.

Figure 4A:
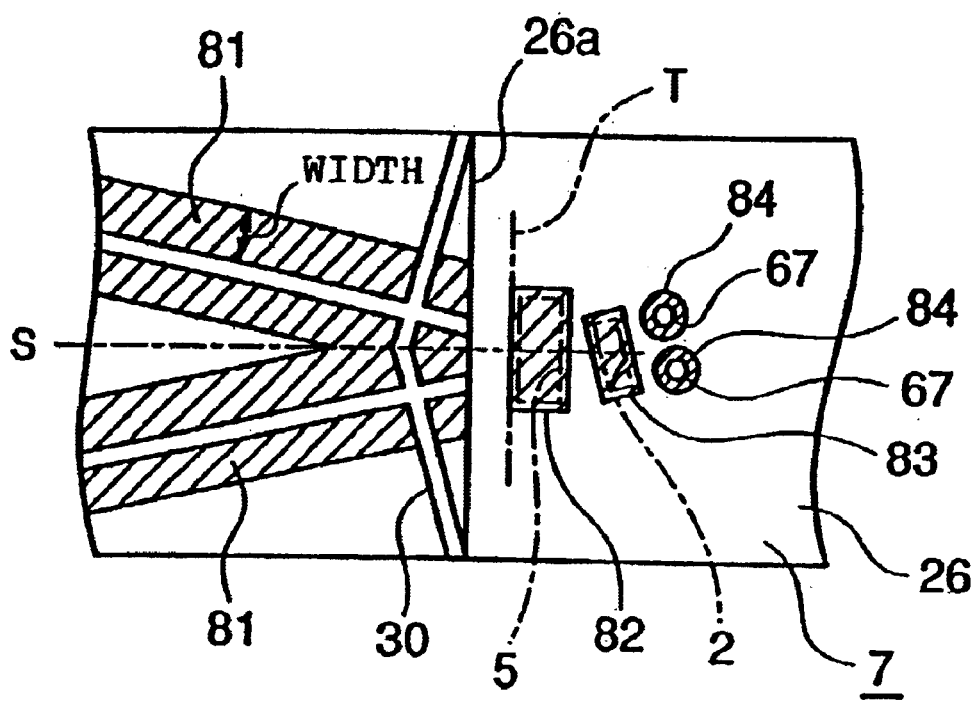
FIG. 4 is an explanatory plan view (a) and an explanatory side view (b) showing part A in FIG. 1.
Figure 4B:
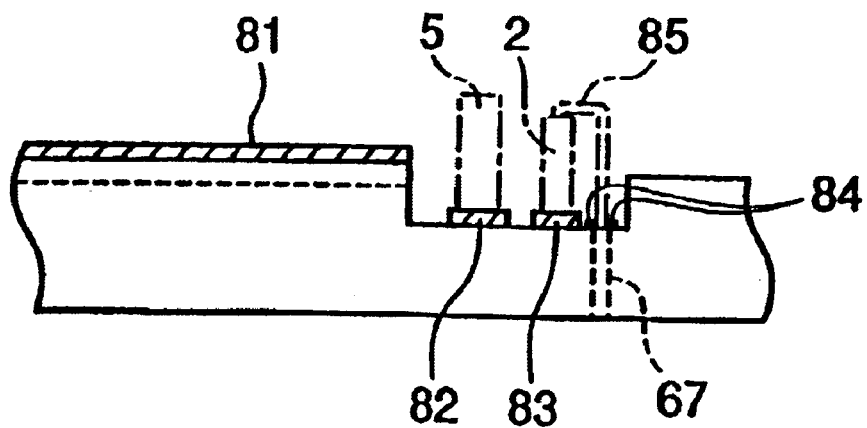

In FIG. 4, part A of FIG. 1(a) is shown in detail. As shown in FIGS. 4(a), (b), on the substrate 7, metal films 81, 82, 83, 84 comprising of different materials, such as Cr, Ni, and Au, are formed. It should be noted that in FIG. 1, these metal films 81, 82, 83, 84 are omitted. These metal films 81, 82, 83, 84 are formed by a mask pattern (not illustrated) at predetermined positions.

The metal film 81 is provided on the both sides sandwiching the optical fiber fixing grooves 9a and 9b, along the optical fiber fixing grooves 9a and 9b, so that a width indicated in FIG. 4(a) becomes around 1 to 2 mm.

The metal films 82, 83, 84 are provided on the concave portion 26. The metal film 82 is used to fix the first filter 5, and the metal film 83 is used to fix the first light-receiving device 2. The metal film 84 formed around the through-hole 67 is used to fix the lead terminal 85 of the first light-receiving device 2.

Figure 2A:
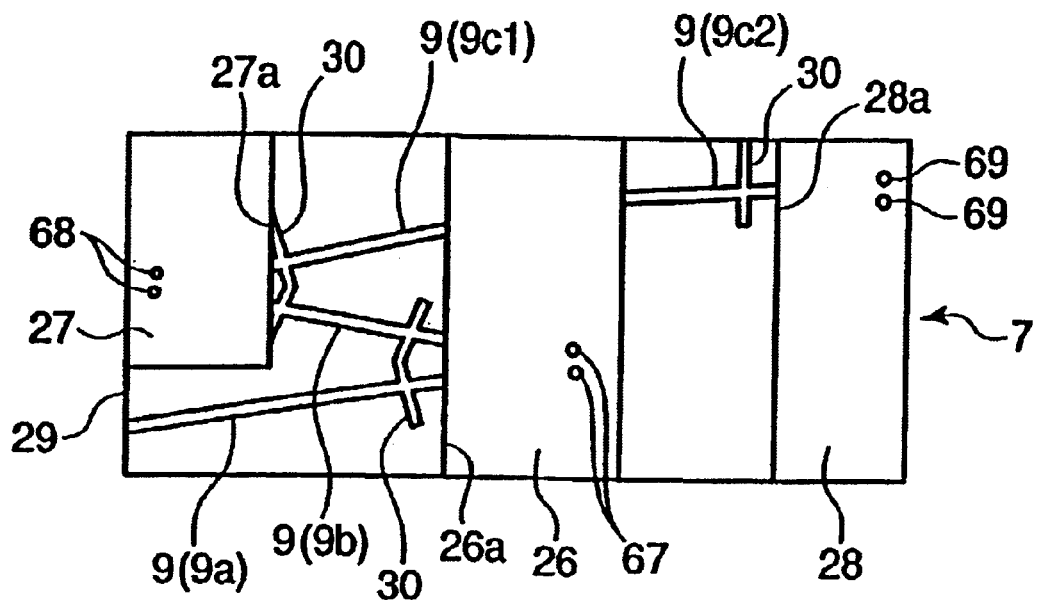
FIG. 2 is an explanatory plan view (a) and an explanatory side view (b) showing a substrate applied to the present embodiment above.
Figure 2B:
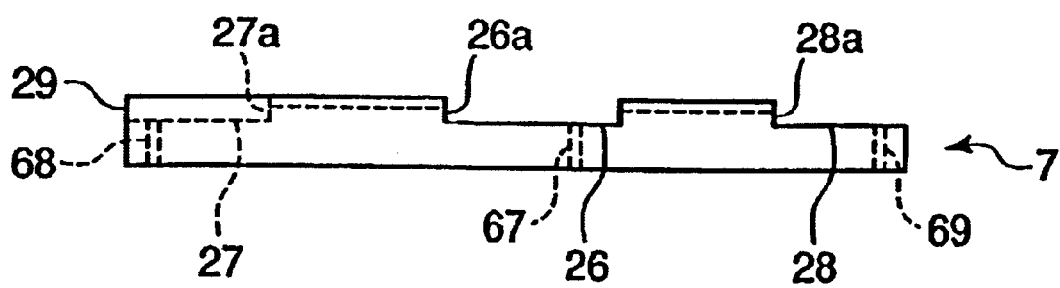

Even if not illustrated in FIG. 1 and FIG. 2, similar to the metal films 81, 82, 83, 84, metal films are formed on the both sides of the optical fiber fixing groove 9c1 and 9c2, and around the disposed positions of the second filter 6, the second light-receiving device 3 and the light-emitting device 4, and the through-holes 68, 69 for passing the lead terminals 86 and 87, on the substrate 7 as illustrated in FIG. 1(a) and FIG. 2(a).

Each lensed fiber of the first, the second, the third optical fibers (1 (1a, 1b, 1c) that constitutes the Lens systems 8 are graded index fibers. This graded index fiber is a fiber having a core diameter of 110 $\mu$m, outer diameter of 125 $\mu$m, with a refractive index distribution shown in FIG. 5.

This refractive index distribution is a distribution where a radial direction dependant feature of a refraction index within the core n(r) is expressed by $n(r)=n_0(1-\Delta(r/a)^\alpha)$, when defining the refraction index of the center of the graded index fiber as $n_0$, a radius of the core as a, and a refractive index of the most external of the core as $n_1$, and $\Delta=(n_0-n_1)/n_0$, and it is 1.44th power distribution where $\alpha$ is set to 1.44.

In addition, the lens system 8 of this graded index fiber is formed having a length over ¼ of the optical path period of a light periodically transmitted through the graded index fiber, and within ⅓ of this optical path period.

The present embodiment has a configuration to efficiently lead the lights of the first predetermined wavelength, the second predetermined wavelength, and the third predetermined wavelength, to the corresponding filters and optical devices, respectively, setting the length of the lens system 8 to the length as described above. Reasons therefore will be explained in the following.

Figure 6A:
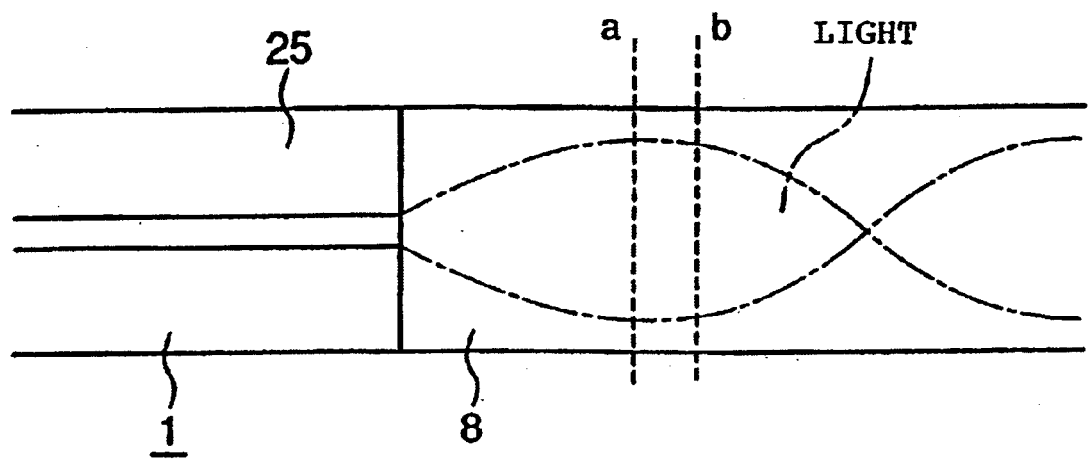
FIG. 6 is an explanatory illustration (a) showing an optical path of a light passing through the graded index fiber, and an explanatory illustration (b) showing a status of a light emitted from a lensed fiber.

As shown in FIG. 6(a), each optical fiber 1 which constitutes the lens system 8 is made by fusion splicing of graded index fiber and the single mode fiber 25.

Figure 5:
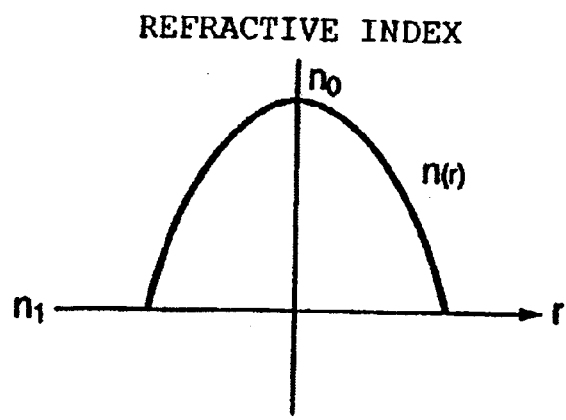
FIG. 5 is a graph showing a refractive index distribution example of a graded index fiber.

In the optical fiber 1 with this configuration, the light propagated through the single mode fiber 25 is incident on the lens system 8, and then, it is periodically transmitted through the lens system 8, as is well known to the light transmission in such graded index fiber as shown in FIG. 5. And an pattern of the light emitted from the lens system 8 depends strongly on the length of the lens system 8.

As described in detail in the Japanese Patent Applications Laid-Open No. 62-501732 and No. 4-25805, it has been considered that the lens system 8 can emit a parallel beam (outgoing beam), by cutting the graded index fiber at the dotted line a in FIG. 6(a), i.e., corresponding to the point where the width of the light periodically transmitting through the lens system 8 becomes the maximum. This line indicates a line that cuts at ¼ length of the optical path period of the light to be transmitted through the graded index fiber periodically.

However, the inventors of the present invention have repeated experiments and tests by a collimator system using a lensed fiber of the graded index fiber. As a result, in the conventional configuration, as shown in FIG. 6(b), at the end of the lens system 8, a light beam emitted in the air slightly spreads around 1.5°.

And, it has been found that, in the case of graded index fiber having the refractive index distribution being 1.44th powered distribution as described in FIG. 5, and the core diameter being 110 μm, as explained in the present embodiment, when a distance between the end face of the graded index fiber and the filter becomes equal to or more than 2 mm, the light reflected by the filter cannot be effectively led to a counterpart to be connected, due to the above slight spread of the emitted light.

Figure 6B:
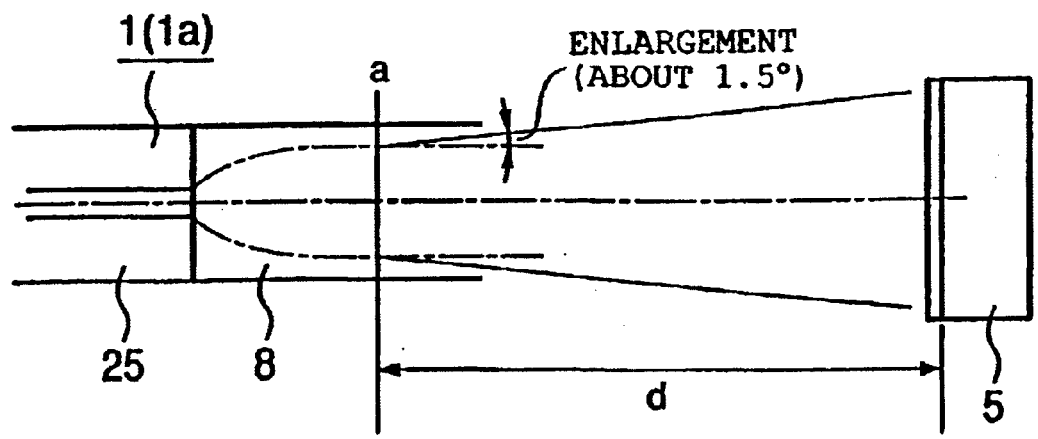

In other words, the inventors of the present invention have found that when the distance d between the end of the first optical fiber 1a and the first filter 5 as shown in FIG. 6(b) becomes equal to 2 mm or more, the light reflected by the first filter 5 will not be effectively led to a connecting counterpart but is spread to outside, causing an extremely large loss.

In addition, in order to avoid the phenomenon above, it has been found that the lens system 8 of this graded index fiber with a length over ¼ optical path period through the graded index fiber, and within ⅓ of this optical path period shows good results.

In other words, it has been found that it is preferable to make the lens system 8, by cutting the graded index fiber at a position (for example, dotted line b in FIG. 6(b)), where the spread light in the graded index fiber exceeds a position becoming parallel and then converging a little. When the graded index fiber was cut at this position, the light emitted into the air becomes parallel, and is effectively led to the optical counterpart, i.e., in the present embodiment, a corresponding filter, optical device and an optical fiber.

Figure 7:
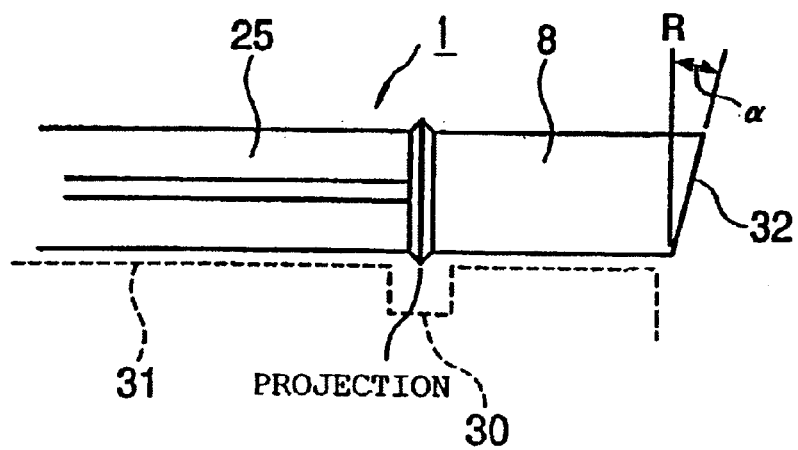
FIG. 7 is an explanatory illustration showing a configuration and arrangement of the lensed fiber applied to the present embodiment above.

Further, in the present embodiment, as shown in FIG. 7, as for the first, the second and the third optical fibers 1a, 1b, and 1c, the respective end faces 32 are placed to be inclined with respect to the surface R, which is perpendicular to the optical axis of the optical fiber, and this inclined angle α is 6–8°. As thus described, when fiber end face 32 is formed in inclined manner, an optical signal transmitted from the single mode fiber 25 is reflected at the end face 32, and deterioration in transmission property can be suppressed.

In addition, in the present embodiment, as for the first, the second, and the third optical fibers 1a, 1b, and 1c, end portions (notched lines) 26a, 27a, and 28a of the concave portions 26, 27, and 28, respectively corresponding to the end faces 32, are considered to be reference lines, and those optical fibers are arranged so that those reference lines and corresponding end faces 32 almost coincide or become parallel.

Figure 8A:
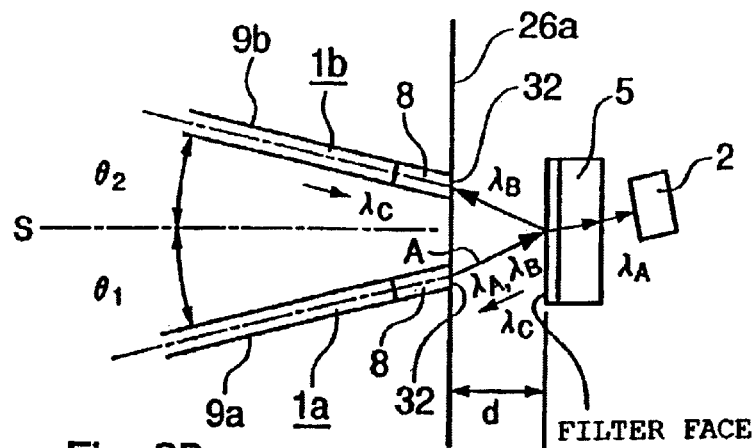
FIG. 8 is explanatory illustration showing an arrangement configuration of the first and the second optical fibers applied to the present embodiment above, and a traveling direction of the light beam.
Figure 8B:
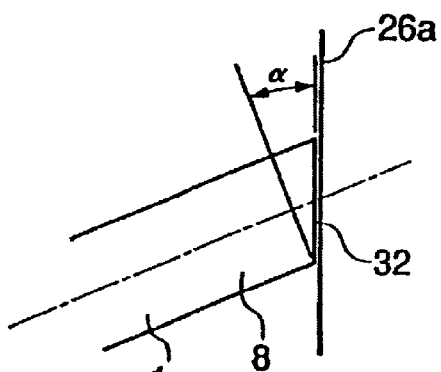
Figure 8C:
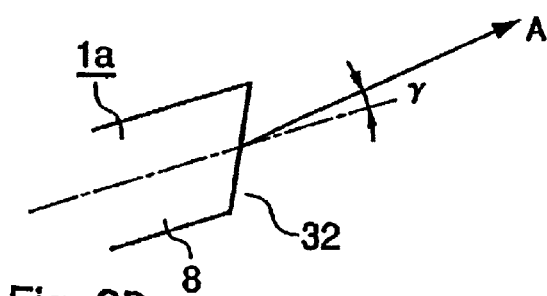
Figure 8D:
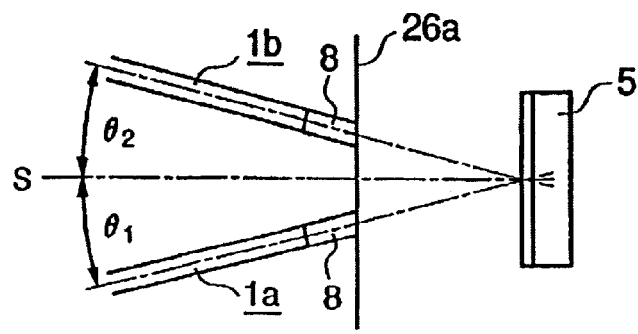

For example, as shown in FIGS. 8(a) and (b), the end face 32 of the first optical fiber 1a is arranged so that it almost coincides with the end 26a of the concave portion 26. In addition, the end face 32 of the second optical fiber 1b in the side opposing to the first filter 5 is also arranged so that it almost coincides with the end 26a of the concave portion 26. And, the end face 32 of the first optical fiber 1a and the end face 32 of the second optical fiber 1b in the side opposing to the first filter 5 are arranged almost parallel with the filter surface of the first filter 5.

Even not illustrated in FIG. 8, the end face 32 of the second optical fiber 1b in the side opposing to the second filter 6 and the end face 32 of the third optical fiber 1c in the side opposing to the second filter 6 are arranged to be almost parallel with the end 27a of the concave portion 27 and the filter surface of the second filter 6. In addition, the end face 32 of the third optical fiber 1c in the side of the light-emitting device 4 is arranged almost parallel with the end 28a of the concave portion 28 and the light-emitting surface of the light-emitting device 4.

In the present embodiment, as described above, the first, the second, the third optical fibers 1a, 1b, 1c are arranged in such a manner that the end faces 32 thereof almost coincide with or parallel with the corresponding reference lines (end portions 26a, 27b, 28c of the concave portions 26, 27 and 28) respectively, and then facilitating a design of the fiber type optical module.

For example, the first optical fiber 1a propagates a light of wavelength $\lambda_A$, which is the first predetermined wavelength, and a light with wavelength $\lambda_B$, which is the second predetermined wavelength, and emitted the lights from the end face 32. When these lights enters into the air from the end face 32 inclined by 6–8° of the end of the lens portion 8, according to Snell's law, as indicated by the arrows in FIGS. 8(a) and (c), they are deflected into a direction slightly inclined from the fiber central axis (specifically to make the angle $\gamma$=8.8–11.8°).

In addition, as described above, the lens system 8 provided in each of the first, the second, the third optical fibers 1 (1a, 1b, 1c) is the graded index fibers. The graded index fiber has an effective lens diameter of around 50–110 μm, and it is smaller than the lens system (several mm) of conventional with a convex glass lens, and the focal length of light beam varies according to emitting position of the single-mode fiber core.

Therefore, for example, a distance the light beam emitted from the lens system 8 of the first optical fiber 1a travels substantially parallel (effective parallel flying distance) is around 1–3 mm and if the light travels more, the light beam proceeds in gradually spreading manner. Therefore, a distance between the end face 32 of the first optical fiber 1a and the filter surface of the first filter 5 is required to be within this range.

Here, for the purpose of comparison, it is assumed a case where the first optical fiber 1a is rotated around the optical axis of the optical fiber by 180° within the optical fiber fixing groove 9a, based on the state as shown in FIG. 8(a), for example, and as shown in FIG. 13, the end face 32 is arranged so that it intersects the end portion 26a of the concave portion 26. In this case, due to the deflection on the end face 32, the effective parallel flying distance of the light beam emitted from the first optical fiber 1a becomes longer by around several ten %, comparing to the effective parallel flying distance in the arrangement as shown in FIG. 8(a).

Then, a probability where the light beam emitted from the first optical fiber 1a is reflected by the first filter 5, and enters the second optical fiber 1b effectively becomes lowered. Therefore, like the present embodiment, it is preferable to arrange the end face 32 of the first optical fiber 1a to be almost coinciding with the end portion 26a of the concave portion 26, or arranging the end face and the end portion 26 parallel to each other.

As thus described, in order to facilitate positioning and assembling of the optical fiber fixing grooves 9a, 9b, 9c1, 9c2, the first and the second filters 5, 6, the first and the second light-receiving devices 2, 3 and the light-emitting device 4 and the like, it is preferable that a reference line for arranging these elements is set to the ends 26a, 27a, and 28a of the concave portions 26, 27 and 28 of the substrate 7, making the end face to coincide with or parallel with the reference line.

In addition, it became easier to fix the first and the second filters 5, 6 when the first and the second filters 5, 6 are provided in parallel with the reference line. It should be noted that, in the present embodiment, since it is preferable that a spaced distance between the end face 32 of the first optical fiber 1a and the filter surface of the first filter 5 is set to less than 1 mm (as for the flying distance; less than 3 mm).

In addition, it is preferable to decide the vertical line (for example, line S in FIGS. 8(a), (d)) perpendicular to the reference line, and at the same time, deciding each spreading angle of optical fiber with respect to the line S become equal, in other words, angle $\theta_1$ made by the line S and the first optical fiber 1a, and the angle $\theta_2$ made by the line S and the second optical fiber 1b become equal (to set $\theta_1 = \theta_2 = \theta$).

Then, in the present embodiment, at least one pair of the lensed fibers next to each other (the first and the second optical fibers 1a, 1b in FIGS. 8(a) and (d)) are arranged in a direction intersecting each other at the end close to the optical device side (here, the first light-receiving device 2), and the first and the second optical fibers 1a, 1b are arranged in such a manner that the angles $\theta_1$ and $\theta_2$ on the ends close to the first optical device 2 side become almost equal to each other, with respect to the line S joining the end faces 32 of the first and the second optical fibers 1a, 1b at one end side close to the light-receiving devices 2.

It should be noted that if a value of the spreading angle $\theta_1$ is made larger, the angle of the first optical fiber 1a and the first filter 5 becomes larger, resulting in the optical flying distance becomes longer. On the other hand, if a value of the spreading angle $\theta_1$ of is made smaller, the space between the first and the second optical fiber fixing grooves 9a and 9b for fixing the first and the second optical fiber 1a and 1b, respectively, becomes narrower, a problem in processing these grooves may occur. Therefore, it is preferable to make the angle $\theta_1$, around 5–10°, and with a same reason, it is also preferable to make the angle $\theta_2$ around 5–10°.

In other words, it is preferable that the angle $(\theta_1+\theta_2=2\theta)$ made by the first optical fiber 1a and the second optical fiber 1b, which are lensed fibers next to each other, is set to around 10 to 20°. Further, it is also preferable that the arrangement of the second optical fiber 1b and the third optical fiber 1c is configured in a similar manner with the end portion 27a of the concave portion 27 as a reference line, and the angle made by the second optical fiber 1b and the third optical fiber 1c is rendered around 10 to 20°.

Further, as indicated by FIG. 8(a), the first light-receiving device 2 is provided on an extension line of the central axis of the light with wavelength $\lambda_A$, which is deflected and passes through the first filter 5.

Similar to the above, as for the second and the third optical fibers 1b, 1c, the second filter 6, the second light-receiving device 3, and light-emitting device 4, the end face 32 is separated from the second filter 6 at a predetermined distance, which is determined in advance in accordance with the refractive index distribution of the lens systems 8 of the second and the third optical fibers 1b, 1c, and the effective parallel flying distance determined by the core diameter, and the above elements are arranged and fixed at appropriate positions on the substrate 7.

As shown in FIG. 2, on the substrate 7, a traversing groove 30 is formed in a direction traversing the optical fiber fixing groove 9, and the portion where the traversing groove 30 is formed, the lens system of the lensed fiber forming the first, the second, and third optical fibers 1 (1a, 1b, 1c) and a splicing portion of the optical fiber are arranged. The traversing groove 30 is provided being almost perpendicular to the optical fiber fixing groove 9, and the depth of the traversing groove is around 20–50 μm.

Further, as shown in FIG. 7, the lensed fiber is prepared by a fusion splicing between the lens system 8 of the graded index fiber and the single mode fiber 25. The outer diameter of the single mode fiber 25 and the graded index fiber used in this lens system 8 are the same, but the core diameter of the graded index fiber has a larger diameter.

The core refractive index of the graded index fiber is higher as the content of germanium to be doped is higher than that of the single mode fiber 25. It should be noted that the content of germanium of the graded index fiber is 5–22%, and the specific refractive index is around 0.4%–2%.

Since the germanium has a low melting point, when the graded index fiber having a large core diameter as described above is subjected to fusion splicing with the single mode fiber 25, protruding part will be formed peripherally at the spliced part between graded index fiber and single mode fiber during the fusion process as shown in FIG. 7 at a level of several to several tens of μm Then, when the first, the second, the third optical fibers 1a, 1b, 1c are fixed to the optical fiber fixing groove 9c1, 9c2, 9c1, 9c2, due to the protruding part, displacement of the central axes may occur as to the first, the second and the third optical fibers 1a, 1b and 1c. Therefore, it is necessary to provide the above-described traversing groove 30 in the present embodiment. It should be noted that in FIG. 7, the reference number 31 indicates a bottom of the optical fiber fixing groove, and the traversing groove 30 is formed more deeply than the optical fiber fixing groove.

As thus described, in the present embodiment, the traversing groove 30 is formed, and the fusion splicing portion between the single mode optical fiber 25 and the graded index fibers of the first, the second, and the third optical fibers 1a, 1b, 1c is fixed at the portion forming the traversing groove 30, and thus, the first, the second, the third optical fibers 1a, 1b, and 1c can be precisely fixed to the optical fiber fixing groove 9c1, 9c2, 9c1, and 9c2.

Figure 9A:
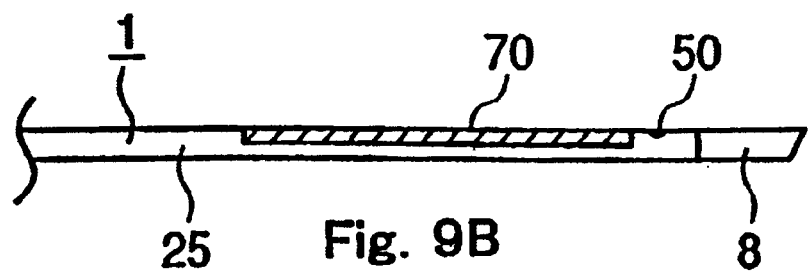
FIG. 9 is an explanatory illustration showing formation configuration example of a positioning portion and a film-forming portion of the optical fiber applied to the present embodiment above.
Figure 9B:
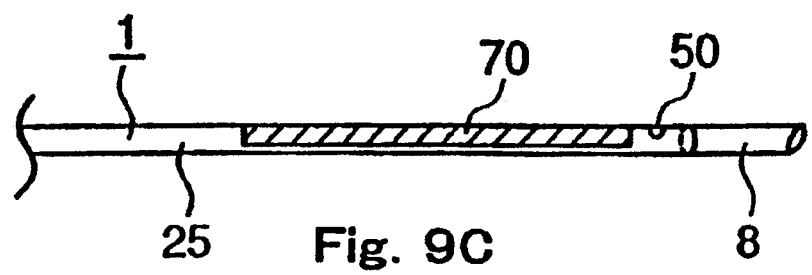
Figure 9C:
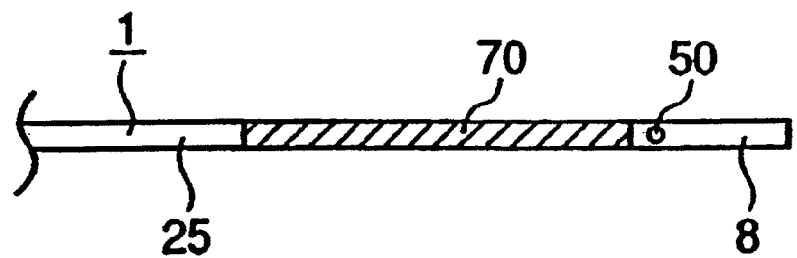

As shown in FIGS. 9(a), (b) and (c), a positioning portion 50 and a film forming portion 70 are provided in each of the first, the second, and the third optical fibers 1 (1a, 1b, 1c) in each predetermined setting position.

These positioning portion 50 and the film forming portion 70 comprises metals such as aluminum, Cr, Ni, and the like, and are formed in a thickness of 0.5–3 μm. In the present embodiment, a thickness of each the positioning portion 50 and a thickness of the film forming portion 70 is 1 μm, respectively.

Figure 10A:
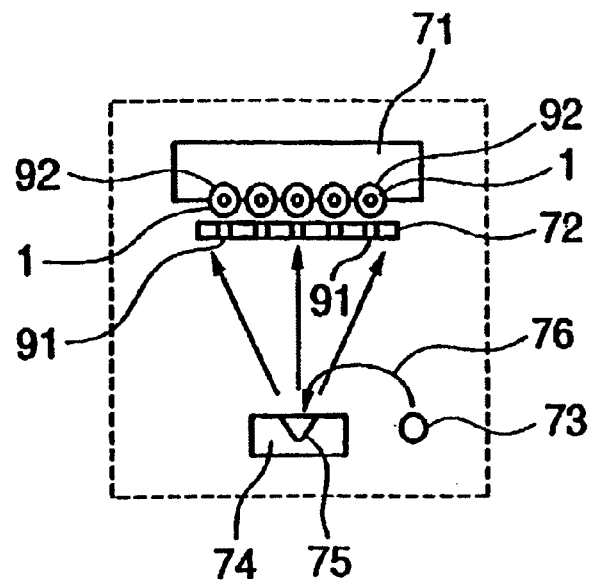
FIG. 10 is an explanatory illustration (a) showing an example formation unit of the positioning portion and the film-forming portion of the optical fiber applied to the present embodiment above, and an arrangement explanatory illustration (b) of the optical fiber disposed in this unit.
Figure 10B:
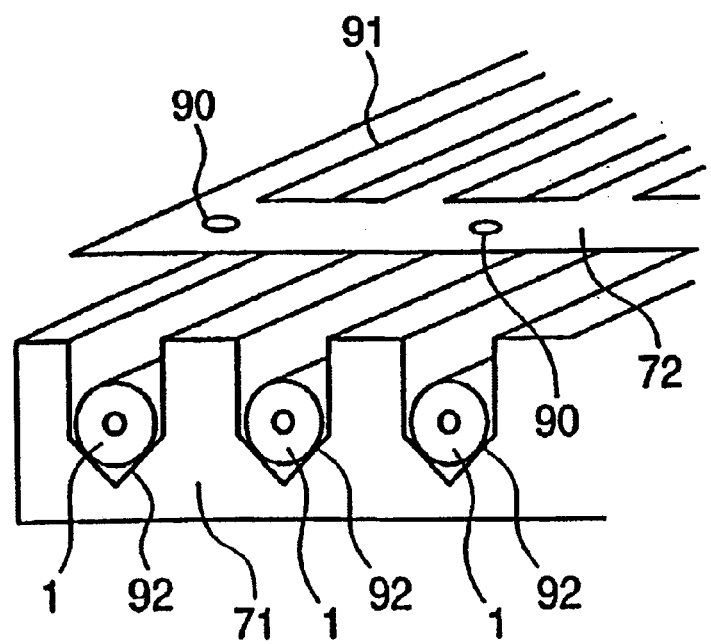

The positioning portion 50 and the film forming portion 70 are formed by means of a film formation means, such as electron beam depositing, sputtering depositing, or ion beam deposition method. In the present embodiment, the electron beam depositing as shown in FIG. 10(*a*) is applied to form the film-forming portion 70. When a film is formed, a plurality of optical fibers 1 are provided on a fiber holder 71 mounted on the upper portion of this device, the fiber holder 71 comprising metals of SUS303 and the like is heated at 100–150° C.

As shown in FIG. 10(*b*), the optical fiber 1 is arranged in a fiber arrangement groove 92 of the fiber holder 71 as shown in FIG. 10(*b*). In this state, as shown in the same FIG. 10(*a*), electron beam 76 from an electron gun 73 is irradiated to the metallic materials 75, such as Cr, Ni, Au stored in a plurality of crucibles 74. Then, the metallic materials 75 are heated and vaporized, and metals are evaporated onto the optical fiber 1 through the openings 90, 91 of the mask 72, to form the film formation portion 70.

Here, the fiber holder 71 is made of metal having high heat conductivity such as copper, or a high heat conductivity insulating material such as aluminum nitride. The mask 72 is made of SUS303 material having a thickness around 0.2 mm.

As described above, by integrating the positioning portion 50 and the film-forming portion 70, a rotational direction of the first, the second, and the third optical fibers 1 can be precisely positioned within the optical fiber fixing groove 9.

Figure 11A:
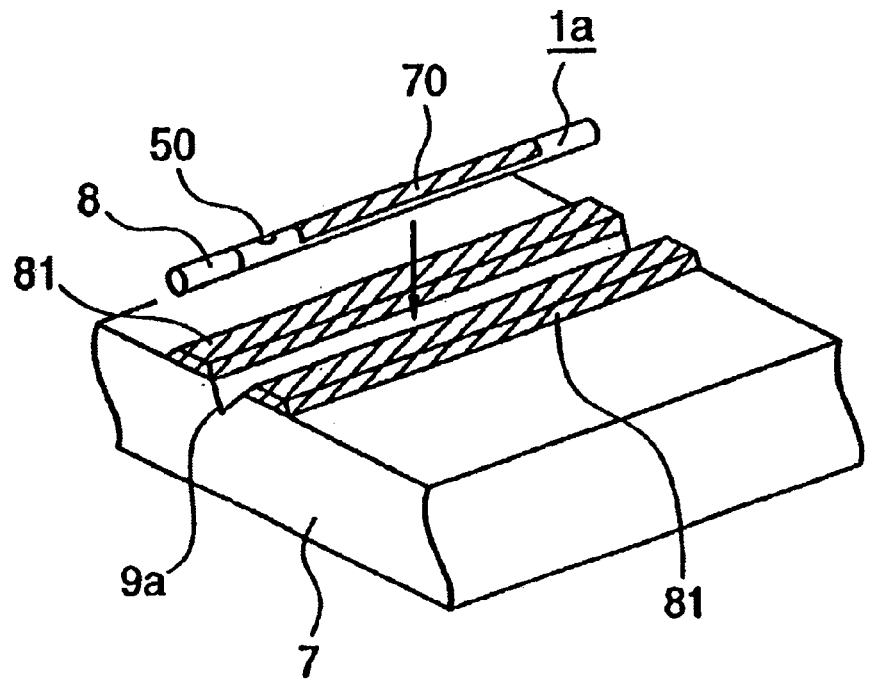
FIG. 11 is an explanatory illustration showing a put-fixing step into an optical fiber fixing groove of the optical fiber applied to the present embodiment example above.
Figure 11B:
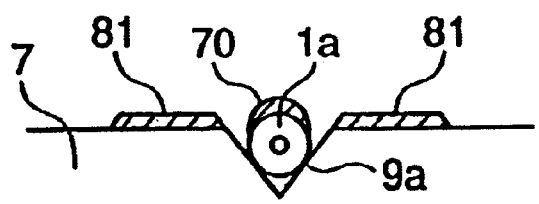
Figure 11C:
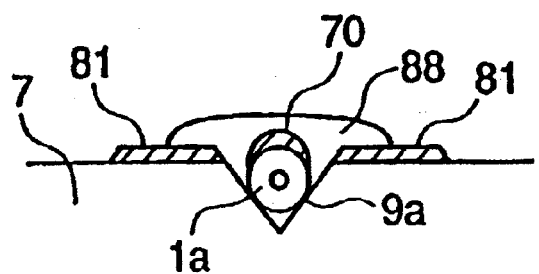

FIG. 11 shows a step for mounting the first optical fiber 1*a* on the substrate 7. As shown in the perspective view of FIG. 11(*a*), the first optical fiber 1*a* is put in the optical fiber fixing groove 9*a*, allowing the positioning means 50 and the film forming portion 70 to be in the upper side, and as shown in the sectional view of the figure (b), they are put in the optical fiber fixing groove 9*a*. Further, as shown in the sectional view of the figure (c), a laser welder and the like is used, and the optical fiber is fixed by soldering to the optical fiber fixing groove 9*a* by an affixing means such as the solder 88 of tin-antimony alloy.

Figure 12A:
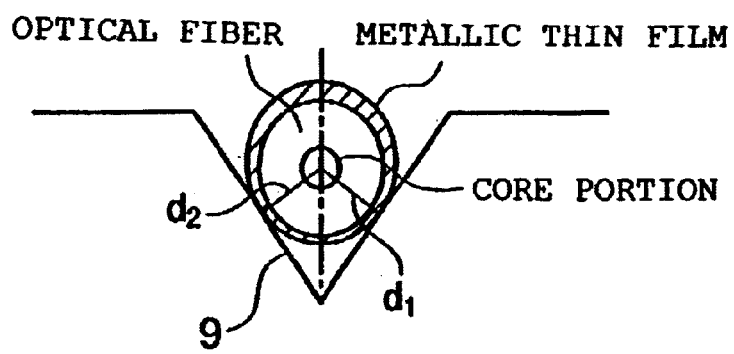
FIG. 12 is an explanatory illustration showing a status of putting the optical fiber onto the optical fiber fixing groove.
Figure 12B:
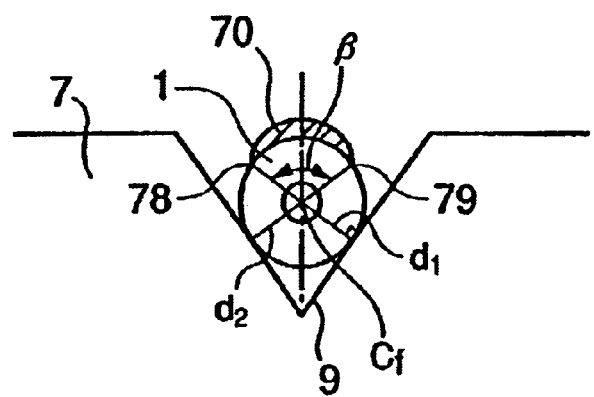

It should be noted that a positioning accuracy of the fiber holding means collimator system is defined by d1 and d2 indicated by FIG. 12, and it is necessary to make the center of the core coincide, with precision of 0.2 μm or less.

However, as in the conventional arts, a collimator system using a lens of a large diameter is fixed in a V-shaped groove and the like, by electrolyzing gold-plating (Ni/Au) or by conducting electroless plating in a thickness around several to several dozens of μm along the entire circumference of the optical fiber as shown in a thing of FIG. 12(*a*).

In this case, the plating thickness has to be kept uniform in the fiber circumferential direction of and in the optical fiber longitudinal direction. However, with such plating of aqueous system, it is extremely difficult substantially to achieve the tolerance of within 0.3 μm as a plating thickness, which is a required positioning accuracy required, due to the non-uniformity in a distribution of metal ion within the electrolyte.

As to this problem, in the present embodiment, it was made possible to achieve the positioning of the first, the second, and the third optical fibers 1 easily and precisely as described above.

In the present embodiment, as shown in FIG. 12(*b*), a line connecting on end side 78 on the region the metal film 70 is formed in the optical fiber circumferential direction, and the center Cf of the optical fiber, and a line connecting the other end side 79 on the region the metal film 70 is formed in the optical fiber circumferential direction, and the center Cf of the optical fiber is formed to make an angle (film depositing angle β of the metal forming portion 70) from around 120° to 180°.

This film depositing angle β is not limited in particular, but it is preferable to be at least 90°. In addition, this film depositing angle β is preferably to be from around 120° to 180°, and from 120° to 150° is more preferable.

When the film depositing angle β is too small, in other words, if the area of the deposited portion is too small, depositing strength as absolute amount is lowered, and then, in a step of fixing by soldering the optical fiber 1 to the optical fiber fixing groove 9, there is a possibility that the metal film 70 is exfoliated. On the other hand, if the film depositing angle β is too large, it becomes difficult to control a distance to be constant, between the sidewall of the optical fiber fixing groove 9 and the core of the optical fiber 1.

The present embodiment is configured as descried above, and this fiber type optical module is installed in the subscriber 12 's house. When the first optical fiber 1*a* is connected to a light transmission line 11, as shown in FIG. 1(*a*), a light with wavelength $\lambda_A$ which is, for instance, a video signal, and a light with wavelength $\lambda_B$ which is a downstream data signal, are incident on the first optical fiber 1*a* from the light transmission line 11.

These lights propagate through the first optical fiber 1*a*, and are emitted from the end face 32, and led to the first filter 5 side. Here, the outgoing beam of the first optical fiber 1*a* goes along the optical path as shown in FIG. 8(*a*) and is incident on the first filter 5.

Then, out of the light with wavelength $\lambda_A$ and $\lambda_B$, the light with wavelength $\lambda_A$ transmits the first filter 5 and received by the first light-receiving device 2, and the light with wavelength $\lambda_B$ is reflected by the first filter 5 and is incident on the second optical fiber 1*b*. As shown in FIG. 1(*a*), after the light with the wavelength $\lambda_B$ propagates through the second optical fiber 1*b*, and is emitted from the end face 32 and is incident on the second filter 6, and then, it passes through the second filter 6 and received by the second light-receiving device 3.

Further, a light with wavelength $\lambda_C$ is emitted from the light-emitting device 4 and is incident on the third optical fiber 1*c*, and after propagating through the third optical fiber 1*c*, it is emitted from the end face 32 and is incident on the second filter 6. The light with wavelength $\lambda_C$ is reflected by the second filter 6 and is incident on the second optical fiber 1*b*, then propagates through the second optical fiber 1*b*.

Afterwards, the light with wavelength $\lambda_C$ is emitted from the end face 32 of the second optical fiber 1*b* and is incident on the first filter 5, and then, it is reflected by the first filter 5 and is incident on the first optical fiber 1*a*. Then, as shown in FIG. 1(*a*), through the first optical fiber 1*a*, it is incident on the light transmission line 11, and transmitted to the exchange 10 side.

The present embodiment operates as described above and optical coupling/decoupling of the lights with 3 wavelengths, $\lambda_A$, $\lambda_B$, $\lambda_C$ can be performed preferably as designed.

In addition, according to the present embodiment, as a collimator, a lensed fiber (the first, the second, the third optical fiber 1*a*, 1*b*, 1*c*) is applied, which connects a lens system 8 of the graded index fiber to the single mode fiber 25. Since it is a configuration that the end face 32 is subjected to an angled polish so as to suppress a returning light, it is possible to largely reduce the number of components in comparison with a conventional optical coupling/ decoupling module. In addition, annoying effect due to reflected light at the end face 32 could also be suppressed.

In addition, according to the present embodiment, optical axis alignment, between the lensed fibers (the first, the second, the third optical fibers 1a, 1b, 1c) and the optical device (the first, the second light-receiving devices 2, 3, and light-emitting device 4), is easier as one can do it on a plane with a simple aligning jig and unit. Therefore, it is possible to assemble the fiber type optical module within 5 minutes, for example, and it is also possible to achieve the fiber type optical module having a high productivity.

Furthermore, in the present embodiment, optical fiber fixing grooves 9a, 9b, 9c1, 9c2 are formed on the substrate 7, and the first, the second, and the third optical fibers 1a, 1b, 1c are fixedly inserted in these optical fiber fixing groove 9a, 9b, 9c1, 9c2. Then, the first and the second light-receiving devices 2, 3 and the light-emitting device 4, spliced by the first, the second, and the third optical fibers 1a, 1b, 1c are fixed on the same substrate 7, resulting that a module configuration can be simplified and a small-sized module can be formed.

Furthermore, in the present embodiment, a metal film is provided on end faces of the first and the second filters 5, 6 and on the substrate 7, and both are soldered. Then, it is possible to abolish an optical fiber for connecting between the coupling/decoupling means 23, 24, and light reception means 13, 14 and light transmitting means 15, which has been conventionally provided in a module, resulting that the housing 17 can be unified. Accordingly, a lot of housings requiring expensive precise machining become unnecessary, and it is possible to reduce the cost, and furthermore, precise connection among optical components can be achieved.

Moreover, according to the present embodiment, the module can be further largely downsized by providing the lens system 8 with the graded index fiber, and a small-sized module can be achieved, for example, with a length in the longitudinal direction of around 15 to 20 mm, the height of around 10–12 mm, and the width of 8 to 12 mm.

The present invention is not limited to the above each embodiment and may have various models for carrying out the invention. For example, in the above embodiment, the first, the second light-receiving device 2, 3 and the light-emitting device 4 were mounted on the same substrate 7, but for instance, the second light-receiving device 3 and light-emitting device 4 may be arranged at a position provided separately from the substrate 7.

Figure 14:
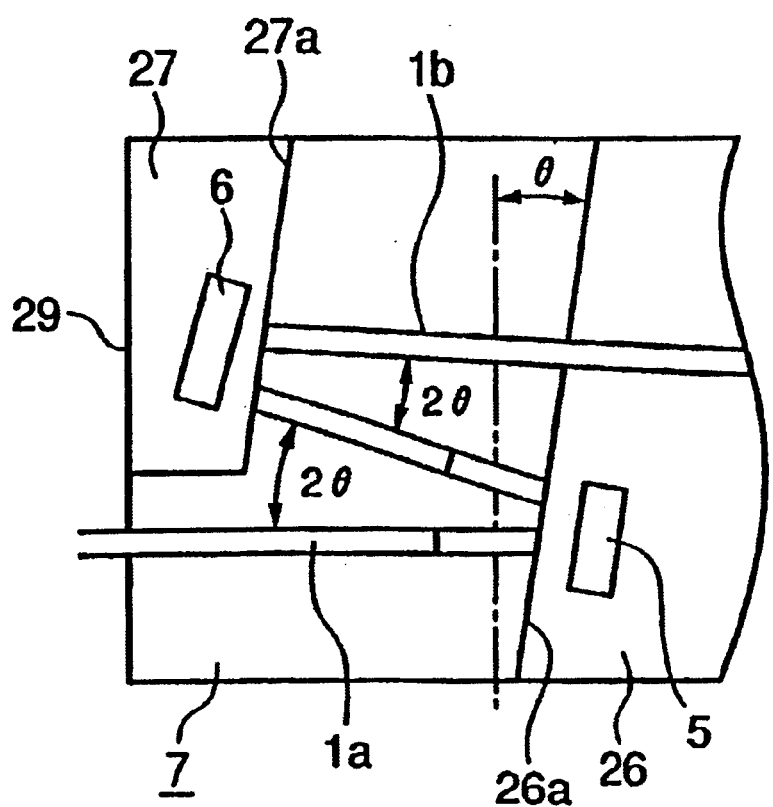
FIG. 14 is an explanatory illustration showing an optical fiber arrangement example in another embodiment of the fiber type optical module relating to the present invention.
Figure 15:
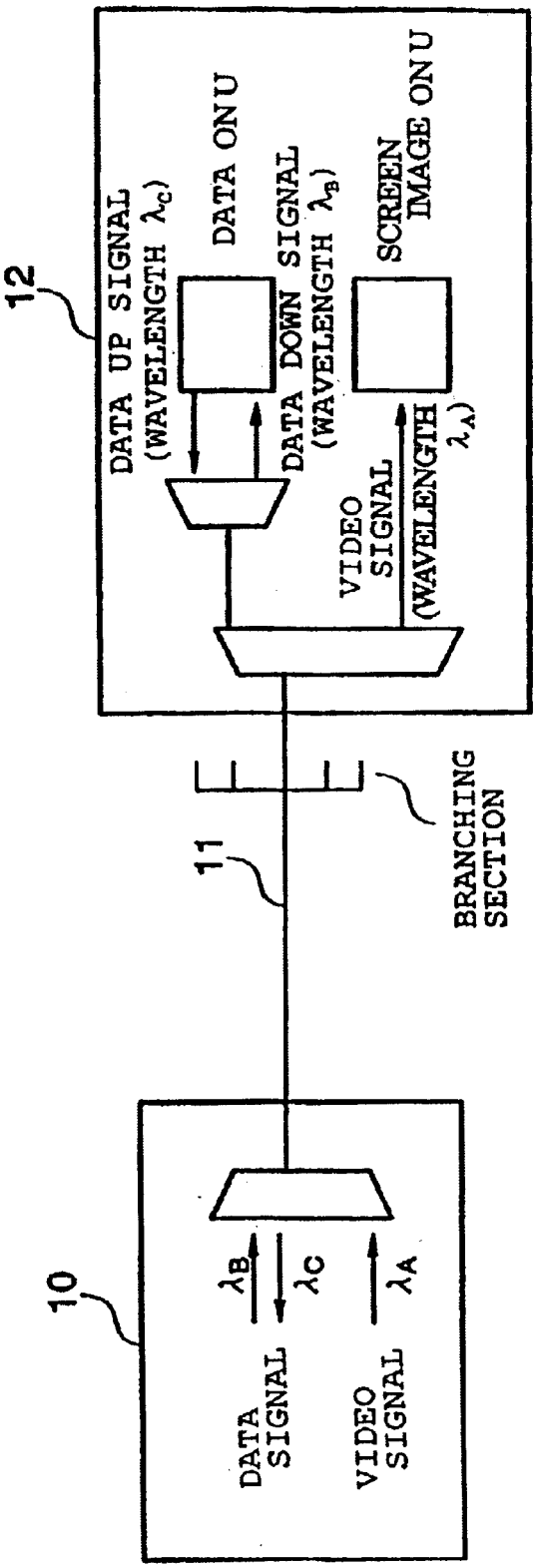
FIG. 15 is a schematic block diagram showing a configuration example of an optical communication system.
Figure 16:
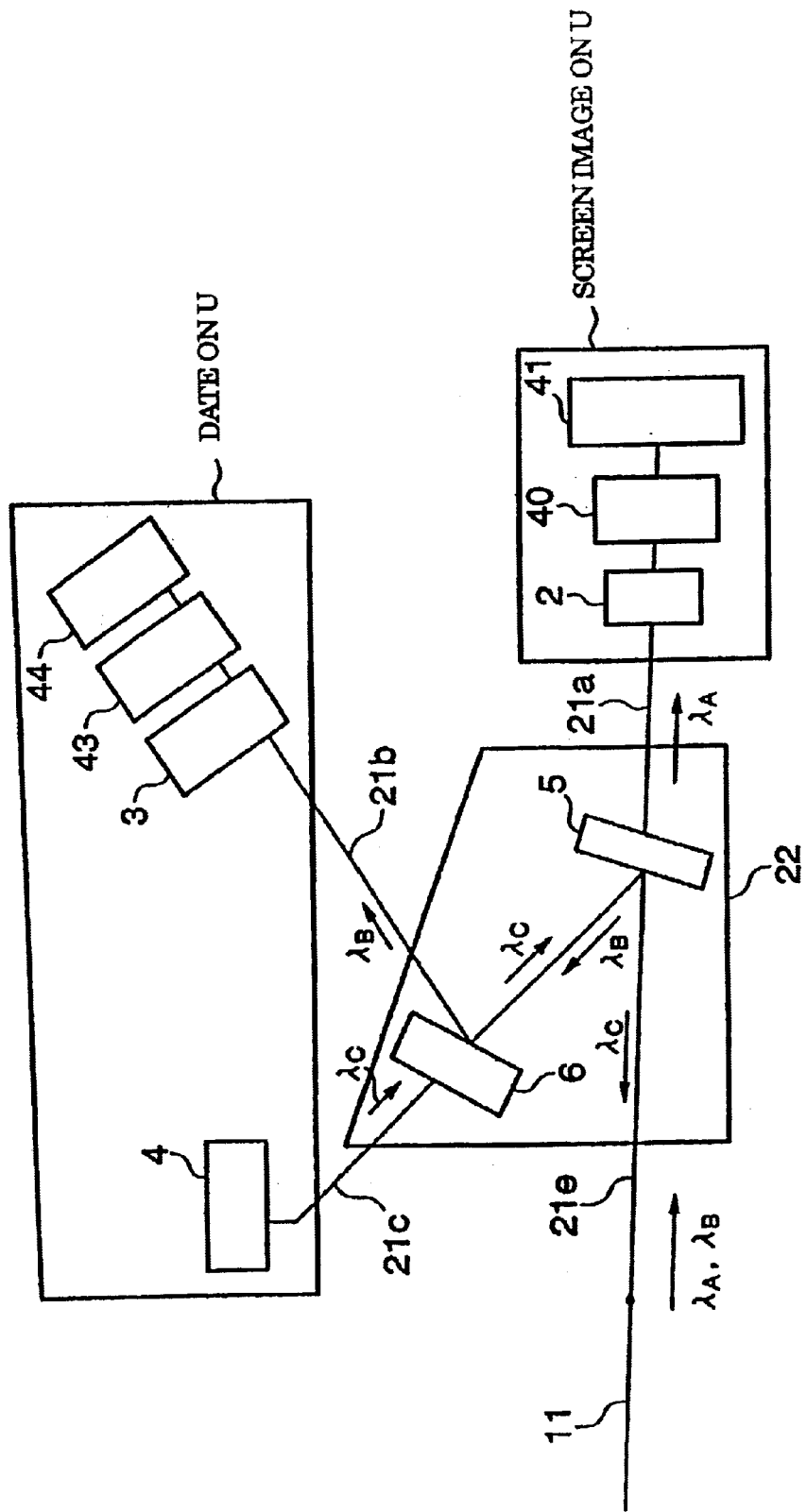
FIG. 16 is a block diagram showing an example of conventional optical coupling/decoupling module.
Figure 17:
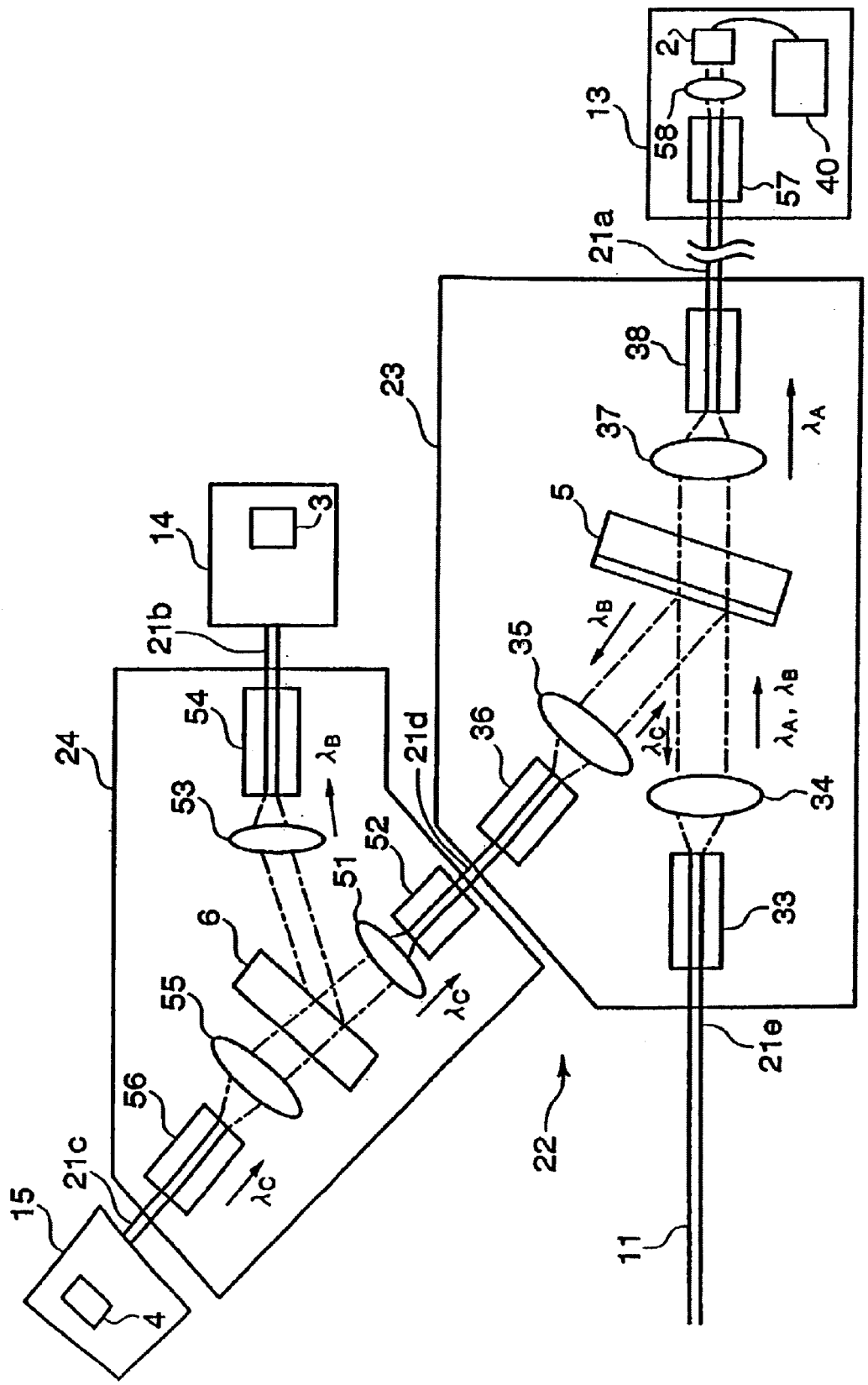
FIG. 17 is an explanatory illustration showing a configuration of the conventional optical coupling/decoupling module as shown in FIG. 17.
Figure 18A:
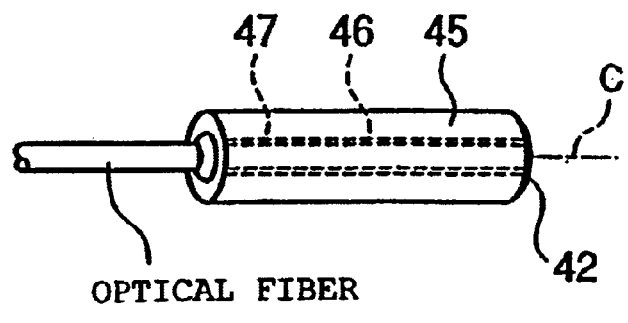
FIGS. 18A and 18B are a perspective view and a sectional view, respectively, of a conventional fiber holding means.
Figure 18B:
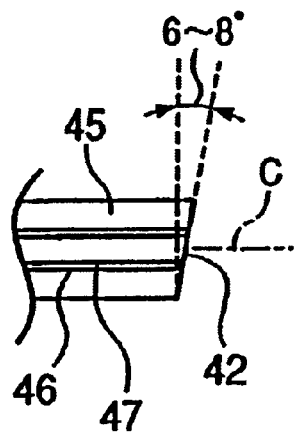
Figure 18C:
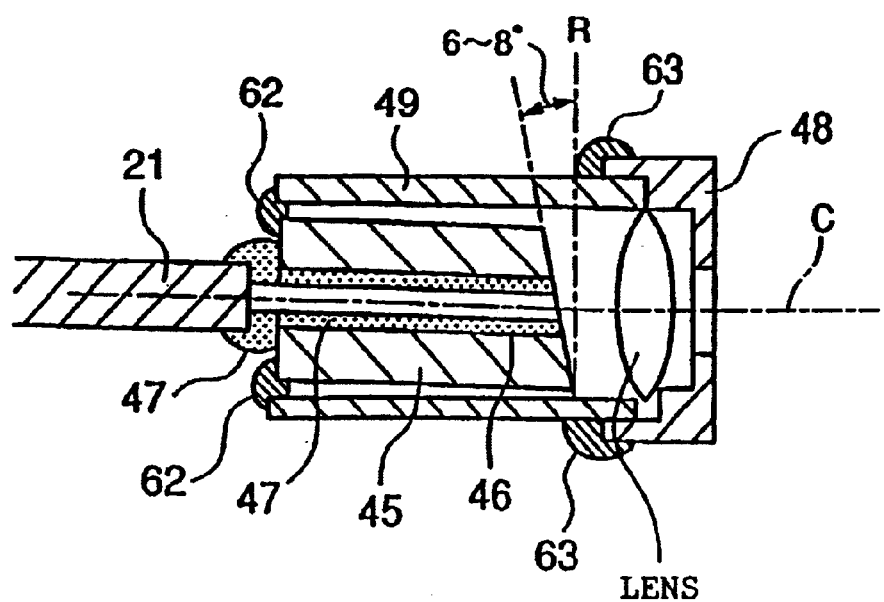
FIG. 18C is a cross-sectional explanatory view showing a configuration example of a conventional lens-fiber holding means integrating the fiber holding means and the lens.
Figure 19:
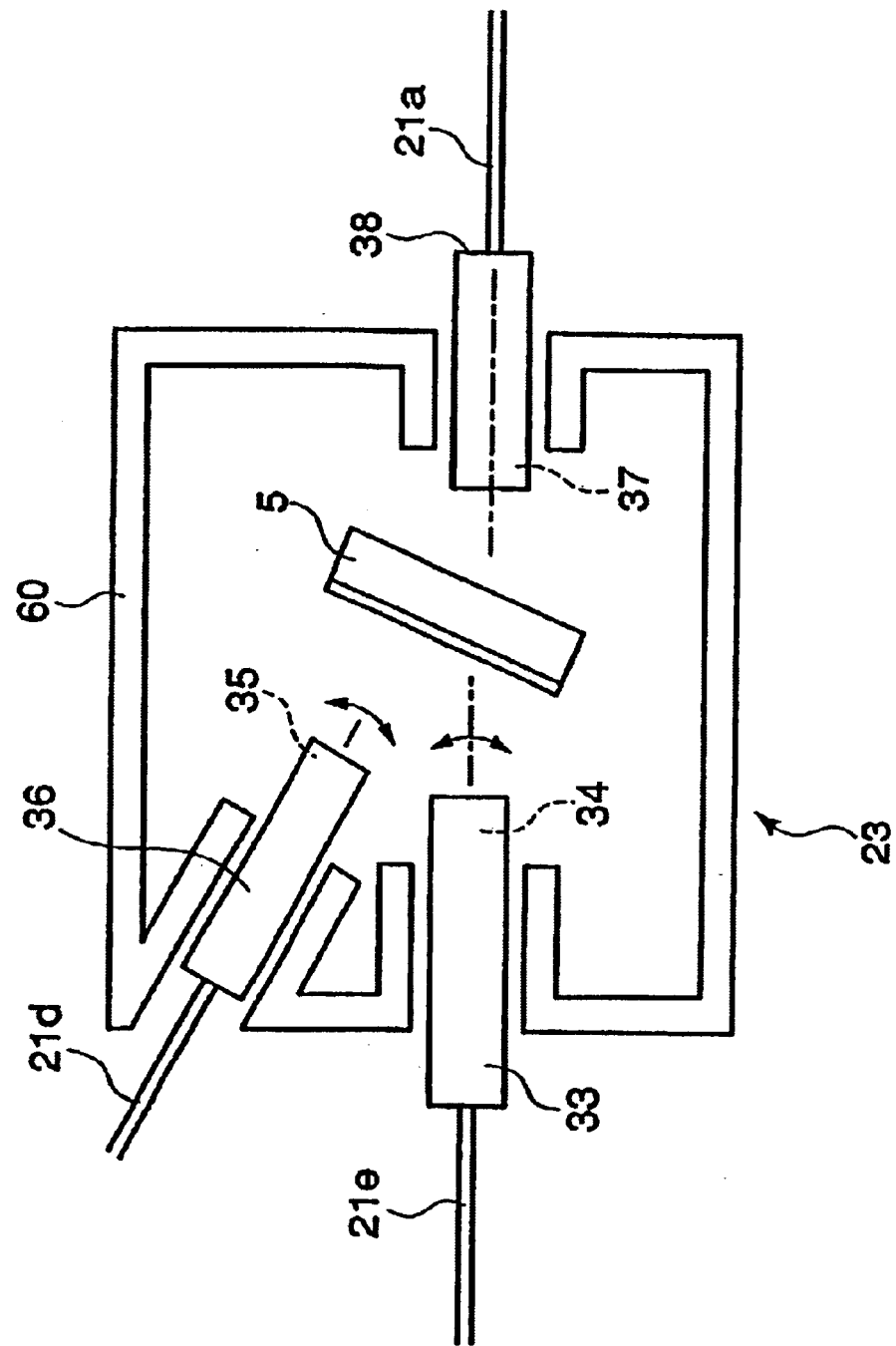
FIG. 19 is an explanatory illustration showing a configuration example of optical coupling/decoupling means applied to a conventional optical coupling/decoupling module.
Figure 20A:
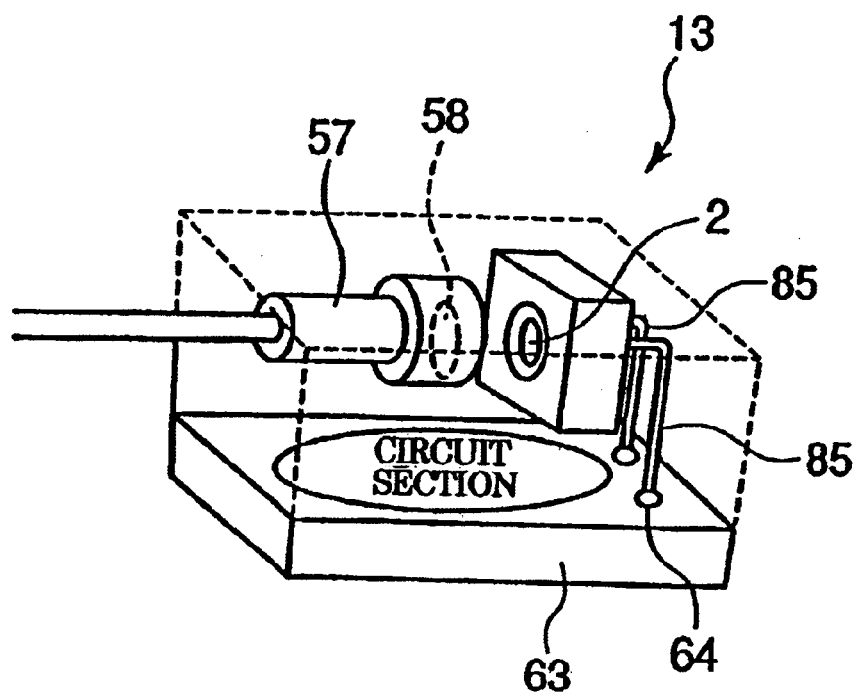
FIG. 20 is an explanatory illustration showing a configuration example of a light reception means applied to the conventional optical coupling/decoupling module.
Figure 20B:
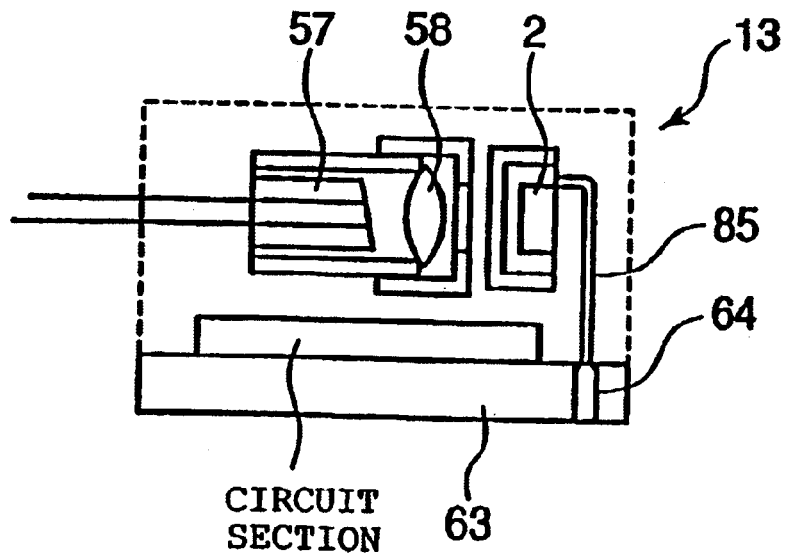

In the above embodiment, end portions 26a, 27a, and 28a, which are formed in parallel with the side surface 29 of the substrate 7, are rendered as a reference line to be referenced for arranging the optical fiber fixing grooves 9a, 9b, and 9c1 and 9c2 and so on. However, as shown in FIG. 14, the end portions 26a, 27a, and 28a are inclined by θ with respect to the side surface 29 of the substrate 7, and the end portions 26a, 27a and 28a in this state can be the reference line. Here, the angle θ is value of one-half of the angle (2 θ) made by the first optical fiber 1a and the second optical fiber 1b.

In addition, the reference line may not always be the end portions 26a, 27a, 28a of the concave portions 26, 27, 28, but as shown the dotted line T in FIG. 4(a), the reference line may be an end portion of the metal film (metal film 82 in the case of FIG. 4(a)) formed for fixing the first filter 5 or the second filter 6.

In addition, in the above embodiment, the lens system 8 is constituted of a graded index fiber, rendering its length over ¼ of the optical path period of a light periodically transmitted through the graded index fiber, and within ⅓ of this optical path period. However, the length of the graded index fiber is not particularly limited. However, setting the length of the graded index fiber as described above is preferable since a light from the lensed fiber can be efficiently led to a counterpart.

Further, in the above embodiment, the traversing groove 30 was formed on the substrate, in the direction to traverse the optical fiber fixing groove 9, but this traversing groove 30 can be omitted.

Further in the above embodiment, the positioning portion 50 and the metal film 70 were formed on the surface of the lensed fiber, but the positioning portion 50 can be omitted, and an optical fiber may be fixed with adhesive to omit the metal film 70.

Further, in the above embodiment, the angle made by the lensed fibers next to each other is made from around 10 to 20°, but the angle made by the optical fibers next to each other is not particularly limited, and may be set appropriately.

Further, in the above embodiment, a cross section of the optical fiber fixing groove 9 is V-groove having a V-shape, but for example, the optical fiber fixing groove 9 may be a groove having a cross section of U-shape.

Furthermore, the fiber type optical module of the present invention may not always be a configuration having the first, the second, the third optical fibers 1a, 1b, 1c and the first, the second light-receiving devices 2, 3, light-emitting device 4 as the above embodiment, but it may be configured as appropriate, such that at least one optical device of either light-receiving device or light-emitting device is provided, and a lensed fiber connecting to the optical device and the optical device are provided on the same substrate.

Effect of the Invention

According to the present invention, an optical device and a lensed fiber are arranged in the same substrate, the lensed fiber is fixed to an optical fiber fixing groove formed on the substrate, and optically connected to a corresponding optical device. Accordingly, it is possible to implement a small-sized and inexpensive fiber type optical module, where the optical device and the lensed fiber are optically connected, with a small number of components, easily, precisely and within a short time.

In other words, the fiber type optical module of the present invention has a high processing precision, and the number of components is small. Further, in the fiber type optical module of the present invention, optical axis alignment can be conducted on a plane, adjustment between the lensed fiber and the optical device is easy, and the adjustment can be performed with a simple aligning jig and unit. Therefore, there is an advantage that process machinery investment can be small. Further, since the fiber type optical module of the present invention does not need a large number of housings, it is possible to reduce the cost.

In addition, in the present invention, it is possible to precisely perform coupling/decoupling of lights with three wavelengths of the first, the second, and the third predetermined wavelengths, with the configuration comprising the first filter for transmitting light of the first predetermined wavelength, and for reflecting the lights of the second and the third predetermined wavelengths, which are different from the first predetermined wavelength, the second filter for transmitting the light of the second predetermined wavelength and for reflecting the light of the third predetermined wavelength, which is different from the second predetermined wavelength, the first, the second, and the third optical fibers optically connected to above elements, the first and the second light-receiving devices and the light-emitting device.

In addition, in the present invention, with the configuration that the lens system of the lensed fiber is graded index fiber, a module can be largely downsized.

In addition, in the present invention, with the configuration where the graded index fiber is formed in a length over ¼ of an optical path period of a light periodically transmitted through the graded index fiber, as well as in a length within ⅓ of this optical path period, it is possible to render the light emitted from the lensed fiber as parallel beam, and it can be efficiently led to the counterpart.

In addition, in the present invention, with a configuration where a traversing groove is formed on the substrate in a direction of traversing the optical fiber fixing groove, the lens system of the lensed fiber and the splicing portion of the optical fiber are arranged in the portion where the traversing groove is formed. With this configuration, even if a projecting part is generated on a splicing portion between the lens system of the lensed fiber and the optical fiber, the lensed fiber can be fixed in a further precise position, by arranging the projecting part in the traversing groove.

In addition, in the present invention with a configuration where, around the lensed fiber, a metal film is formed in a partial area in the circumferential direction of the optical fiber, and since a forming range of the metal film forming area is determined, it is possible to control a distance between the side surface of the optical fiber fixing groove and the core of the optical fiber, as well as appropriately fixing by soldering the optical fiber in the optical fiber fixing groove, by use of the metal film.

In addition, in the present invention with a configuration where in the lensed fiber, a positioning portion for deciding an insert position in the optical fiber fixing groove is formed, and it is possible to fix the lensed fiber to position further precisely and easily.

In addition, in the present invention with a configuration where a plurality of lensed fibers are provided, at least one pair of the lensed fibers next to each other are arranged in a direction intersecting each other at an end close to the optical device side, and those lensed fibers are arranged to be set in such a manner that angles of the ends close to the optical device side become almost equal to each other, with respect to a perpendicular line joining the end faces on one end close to the optical device side of the lensed fibers, a process onto the end face of the lensed optical fiber can be performed easily and precisely.

In addition, in the present invention with a configuration where a plurality of lensed fibers are provided, at least one pair of the lensed fibers next to each other are arranged in a direction intersecting each other at an end close to the optical device side, and the angles formed by these lensed fibers next to each other are from around 10 to 20°, it is possible to arrange a plurality of lensed fibers further easily and preferably.

In addition, in the present invention with a configuration where the optical fiber fixing groove is V-groove, which indicates the cross-section is V-shaped, forming the optical fiber fixing groove is easy and fixing and inserting of the lensed fiber is simple and precise.

The symbols in the drawing is as follows:

1a: the first optical fiber; 1b: the second optical fiber; 1c: the third optical fiber; 2: the first light-receiving device; 3: the second light-receiving device; 4: light-emitting device; 5: the first filter; 6: the second filter; 7: substrate; 8: lens system; 9, 9a, 9b, 9c1, 9c2: optical fiber fixing groove; 17: housing; 25: single mode fiber; 26,27,28: concave portion; and 30: traversing groove.

What is claimed is:

1. A fiber type optical module, wherein at least one optical device is provided at least either a light-receiving device or a light-emitting device, wherein a lensed fiber formed by integrating a lens system at least on one end side and said optical device are arranged on a common substrate and accommodated in a housing, and wherein said lensed fiber fixed in an optical fiber fixing groove formed on said substrate and optically connected with a corresponding optical device, wherein a first filter that transmits a light with a first predetermined wavelength, and reflects lights with a second predetermined wavelength and a third predetermined wavelength, which are different from said first predetermined wavelength, and a second filter that transmits the light with the second predetermined wavelength and reflects the light with the third predetermined wavelength, which is different from said second predetermined wavelength, are provided on a substrate, wherein on said substrate, a light-emitting device that emits the light with the third predetermined wavelength is provided in an incident side of said second filter, and a first optical fiber for leading the lights with the first predetermined wavelength and the second predetermined wavelength to the first filter, a second optical fiber for leading the light with the second predetermined wavelength reflected by the first filter to the second filter, and the third optical fiber for leading the light with the third predetermined wavelength emitted by the light-emitting device to the second filter are respectively formed in the lensed fiber, and wherein further the first optical fiber is fixedly inserted into a first optical fiber fixing groove formed in a direction intersecting the first filter, the second optical fiber is fixed in the second optical fiber fixing groove formed in a direction intersecting the first filter and the second filter, and the third optical fiber is fixedly inserted in the third optical fiber fixing groove provided in a direction intersecting the second filter, and on the substrate, the first light-receiving device for receiving the light with the first predetermined wavelength in the optical transmission side of the first filter is provided, and in the optical transmission side of the second filter, the second light-receiving device for receiving the light with the second predetermined wavelength is provided.

2. A fiber type optical module as claimed in claim 1, wherein the lens system of the lensed fiber is of graded index fiber.

3. A fiber type optical module, wherein at least one optical device is provided at least either a light-receiving device or a light-emitting device, wherein a lensed fiber formed by integrating a lens system at least on one end side and said optical device are arranged on a common substrate and accommodated in a housing, and wherein said lensed fiber fixed in an optical fiber fixing groove formed on said substrate and optically connected with a corresponding optical device, wherein the lens system of the lensed fiber is of graded index fiber, and wherein the graded index fiber is formed in a length over ¼ of an optical path period of a light periodically transmitted through the graded index fiber, as well as in a length within ⅓ of said optical path period.

4. A fiber type optical module, wherein at least one optical device is provided at least either a light-receiving device or a light-emitting device, wherein a lensed fiber formed by integrating a lens system at least on one end side and said optical device are arranged on a common substrate and accommodated in a housing, and wherein said lensed fiber fixed in an optical fiber fixing groove formed on said substrate and optically connected with a corresponding optical device, wherein a traversing groove is formed on the substrate in a direction of traversing the optical fiber fixing groove, the lens system of the lensed fiber and the spliced part of the optical fiber are arranged in the portion where said traversing groove is formed.

5. A fiber type optical module, wherein at least one optical device is provided at least either a light-receiving device or a light-emitting device, wherein a lensed fiber formed by integrating a lens system at least on one end side and said optical device are arranged on a common substrate and accommodated in a housing, and wherein said lensed fiber fixed in an optical fiber fixing groove formed on said substrate and optically connected with a corresponding optical device, wherein around the lensed fiber, a metal film is formed in a partial area in the circumferential direction of the optical fiber, and a line joining one end side of said metal film formed area in the optical fiber circumferential direction and the center of the optical fiber, and a line joining the other end side of said metal film formed area in the optical fiber circumferential direction and the center of the optical fiber, make an angle from 120 to 180°.

6. A fiber type optical module as claimed in claim 1, wherein in the lensed fiber, a positioning portion for deciding an putting position in the optical fiber fixing groove is formed.

7. A fiber type optical module as claimed in claim 1, wherein a plurality of lensed fibers are provided, at least one pair of the lensed fibers next to each other are arranged in a direction intersecting each other at an end close to the optical device side, and those lensed fibers are arranged to be set in such a manner that angles at the ends close to the side of the optical device become almost equal to each other, with respect to a perpendicular line joining the end faces on one end close to the side of the optical device of the lensed fibers.

8. A fiber type optical module, wherein at least one optical device is provided at least either a light-receiving device or a light-emitting device, wherein a lensed fiber formed by integrating a lens system at least on one end side and said optical device are arranged on a common substrate and accommodated in a housing, and wherein said lensed fiber fixed in an optical fiber fixing groove formed on said substrate and optically connected with a corresponding optical device, wherein a plurality of lensed fibers are provided, at least one pair of the lensed fibers next to each other are arranged in a direction intersecting each other at an end close to the optical device side, and the angles formed by these lensed fibers are from around 10 to 20°.

9. A fiber type optical module as claimed in claim 1, wherein the optical fiber fixing groove is V-groove, which indicates the cross-section is V-shaped.

* * * * *